US008345161B2

(12) United States Patent
Nishigaki

(10) Patent No.: US 8,345,161 B2
(45) Date of Patent: Jan. 1, 2013

(54) SIGNAL PROCESSING DEVICE, AND IMAGE OUTPUT DEVICE

(75) Inventor: Tomoo Nishigaki, Ichikawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 1495 days.

(21) Appl. No.: 11/887,345

(22) PCT Filed: Oct. 14, 2005

(86) PCT No.: PCT/JP2005/018971

§ 371 (c)(1), (2), (4) Date: Sep. 28, 2007

(87) PCT Pub. No.: WO2006/112064

PCT Pub. Date: Oct. 26, 2006

(65) Prior Publication Data

US 2009/0128691 A1 May 21, 2009

(30) Foreign Application Priority Data

Mar. 31, 2005 (JP) ................................ 2005-103774

(51) Int. Cl.
*H04N 9/74* (2006.01)
*H04N 7/00* (2011.01)

(52) U.S. Cl. ......... 348/581; 348/441; 348/468; 348/584

(58) Field of Classification Search ........................ None
See application file for complete search history.

(56) References Cited

U.S. PATENT DOCUMENTS 5,990,924 A 11/1999 Kido et al.
6,115,077 A * 9/2000 Tsukagoshi .................. 348/607
6,437,881 B1 8/2002 Baba et al.
7,768,564 B2 * 8/2010 Miura ...................... 348/333.01
2002/0135584 A1 9/2002 Lee
2003/0026616 A1 2/2003 Watanabe et al.
2003/0231259 A1 12/2003 Yui et al.
2006/0056716 A1 3/2006 Komeno

FOREIGN PATENT DOCUMENTS

| | | | |
|---|---|---|---|
| EP | 1199888 | A2 | 4/2002 |
| JP | 7-319445 | A | 12/1995 |
| JP | 10-20847 | A | 1/1998 |
| JP | 10-294864 | A | 11/1998 |
| JP | 2000-347638 | A | 12/2000 |
| JP | 2001-8098 | A | 1/2001 |
| JP | 2003-123066 | A | 4/2003 |
| JP | 2003-198975 | A | 7/2003 |
| TW | 488159 | | 5/2002 |
| TW | 571586 | | 1/2004 |
| WO | WO 2004/091198 | A1 | 10/2004 |

* cited by examiner

*Primary Examiner* — Kristine Kincaid
*Assistant Examiner* — James Marandi
(74) *Attorney, Agent, or Firm* — Birch, Stewart, Kolasch & Birch, LLP

(57) ABSTRACT

In a case of changing the resolution of the synthesized image signal obtained by synthesizing the first image signal and a second image signal, identification information for identifying whether or not the character signal is contained is added to the synthesized image signal based on presence/absence of the character signal, by a character signal creating unit and a character signal synthesizing unit. Then, based on the identification information, a resolution changing unit separates the synthesized image signal into a third image signal containing a component of the character signal and a fourth image signal containing no component of the character signal, changes the resolutions of the third image signal and the fourth image signal, and synthesizes the third image signal and the fourth image signal with the resolutions changed, based on the identification information.

20 Claims, 16 Drawing Sheets

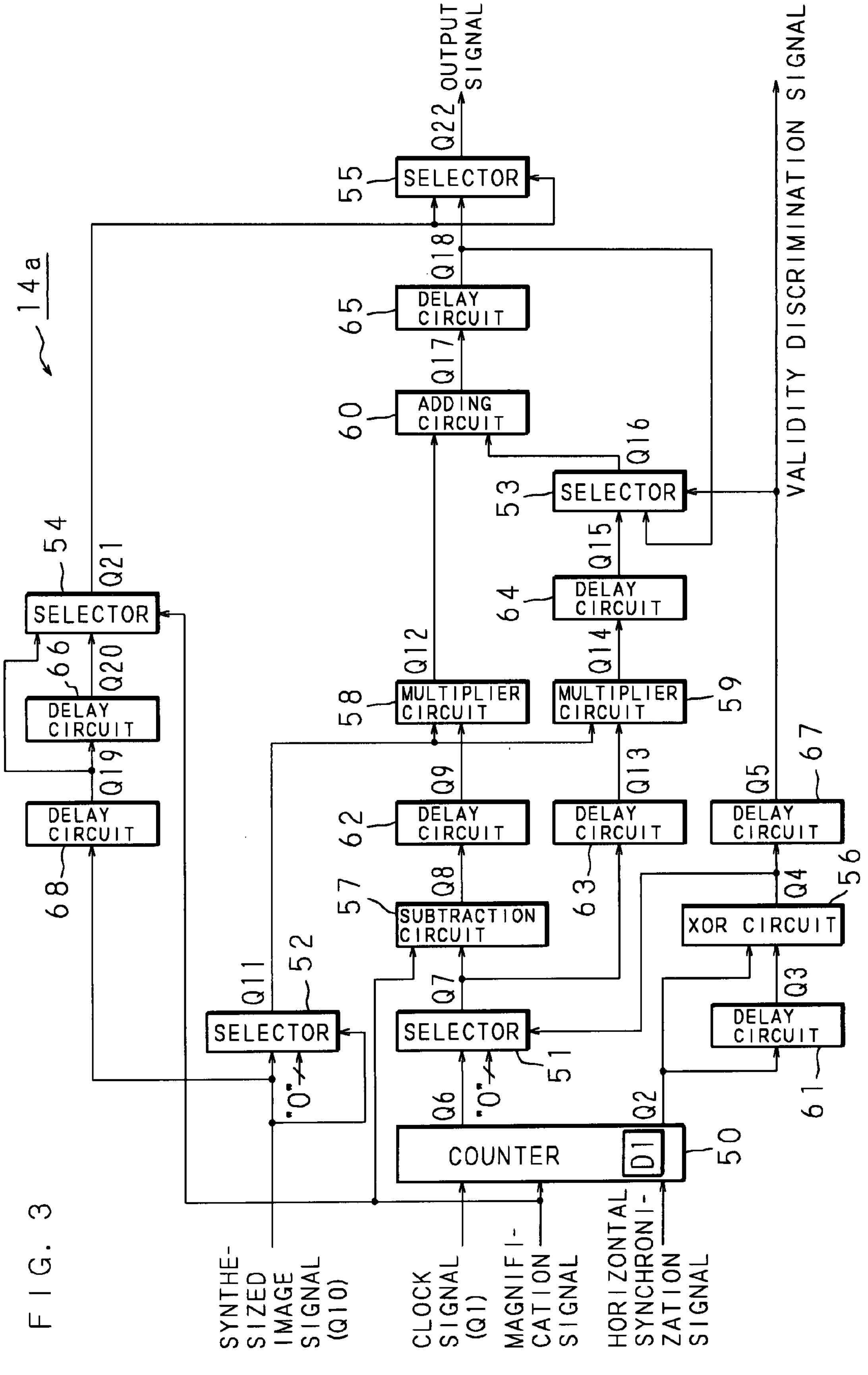
F I G. 3

| | | | | | | | | | | | | | | | | | | | | | |
|---|---|---|---|---|---|---|---|---|---|---|---|---|---|---|---|---|---|---|---|---|---|
| Q6 | 6 | 12 | 2 | 8 | 14 | 4 | 10 | 0 | 6 | 12 | 2 | 8 | 14 | 4 | 10 | 0 | 6 | 12 | 2 | 8 | 14 |
| Q7 | 0 | 0 | 2 | 0 | 0 | 4 | 0 | 0 | 0 | 0 | 2 | 0 | 0 | 4 | 0 | 0 | 0 | 0 | 2 | 0 | 0 |
| Q8 | 6 | 6 | 4 | 6 | 6 | 2 | 6 | 6 | 6 | 6 | 4 | 6 | 6 | 2 | 6 | 6 | 6 | 6 | 4 | 6 | 6 |
| Q9 | | 6 | 6 | 4 | 6 | 6 | 2 | 6 | 6 | 6 | 6 | 4 | 6 | 6 | 2 | 6 | 6 | 6 | 6 | 4 | 6 |
| Q10 | | 0 | 0 | 0 | 0 | 0 | 0 | 0 | 1 | 1 | 1 | 0 | 0 | 0 | 0 | 1 | 1 | 1 | 1 | 0 | 0 |
| | | $Y_0$ | $Y_1$ | $Y_2$ | $Y_3$ | $Y_4$ | $Y_5$ | $Y_6$ | $Y_7$ | $Y_8$ | $Y_9$ | $Y_{10}$ | $Y_{11}$ | $Y_{12}$ | $Y_{13}$ | $Y_{14}$ | $Y_{15}$ | $Y_{16}$ | $Y_{17}$ | $Y_{18}$ | $Y_{19}$ |
| Q11 | | $Y_0$ | $Y_1$ | $Y_2$ | $Y_3$ | $Y_4$ | $Y_5$ | $Y_6$ | 0 | 0 | 0 | $Y_{10}$ | $Y_{11}$ | $Y_{12}$ | $Y_{13}$ | 0 | 0 | 0 | 0 | $Y_{18}$ | $Y_{19}$ |
| Q12 | | $6Y_0$ | $6Y_1$ | $4Y_2$ | $6Y_3$ | $6Y_4$ | $2Y_5$ | $6Y_6$ | 0 | 0 | 0 | $4Y_{10}$ | $6Y_{11}$ | $6Y_{12}$ | $2Y_{13}$ | 0 | 0 | 0 | 0 | $4Y_{18}$ | $6Y_{19}$ |

※1/16 IS OMITTED

| | | | | | | | | | | | | | | | | | | | | | |
|---|---|---|---|---|---|---|---|---|---|---|---|---|---|---|---|---|---|---|---|---|---|
| Q13 | | 0 | 0 | 2 | 0 | 0 | 4 | 0 | 0 | 0 | 0 | 2 | 0 | 0 | 4 | 0 | 0 | 0 | 0 | 2 | 0 |
| Q14 | | 0 | 0 | $2Y_2$ | 0 | 0 | $4Y_5$ | 0 | 0 | 0 | 0 | $2Y_{10}$ | 0 | 0 | $4Y_{13}$ | 0 | 0 | 0 | 0 | $2Y_{18}$ | 0 |

※1/16 IS OMITTED

| | | | | | | | | | | | | | | | | | | | | | |
|---|---|---|---|---|---|---|---|---|---|---|---|---|---|---|---|---|---|---|---|---|---|
| Q15 | | | 0 | 0 | $2Y_2$ | 0 | 0 | $4Y_5$ | 0 | 0 | 0 | 0 | $2Y_{10}$ | 0 | 0 | $4Y_{13}$ | 0 | 0 | 0 | 0 | $2Y_{18}$ |

※1/16 IS OMITTED

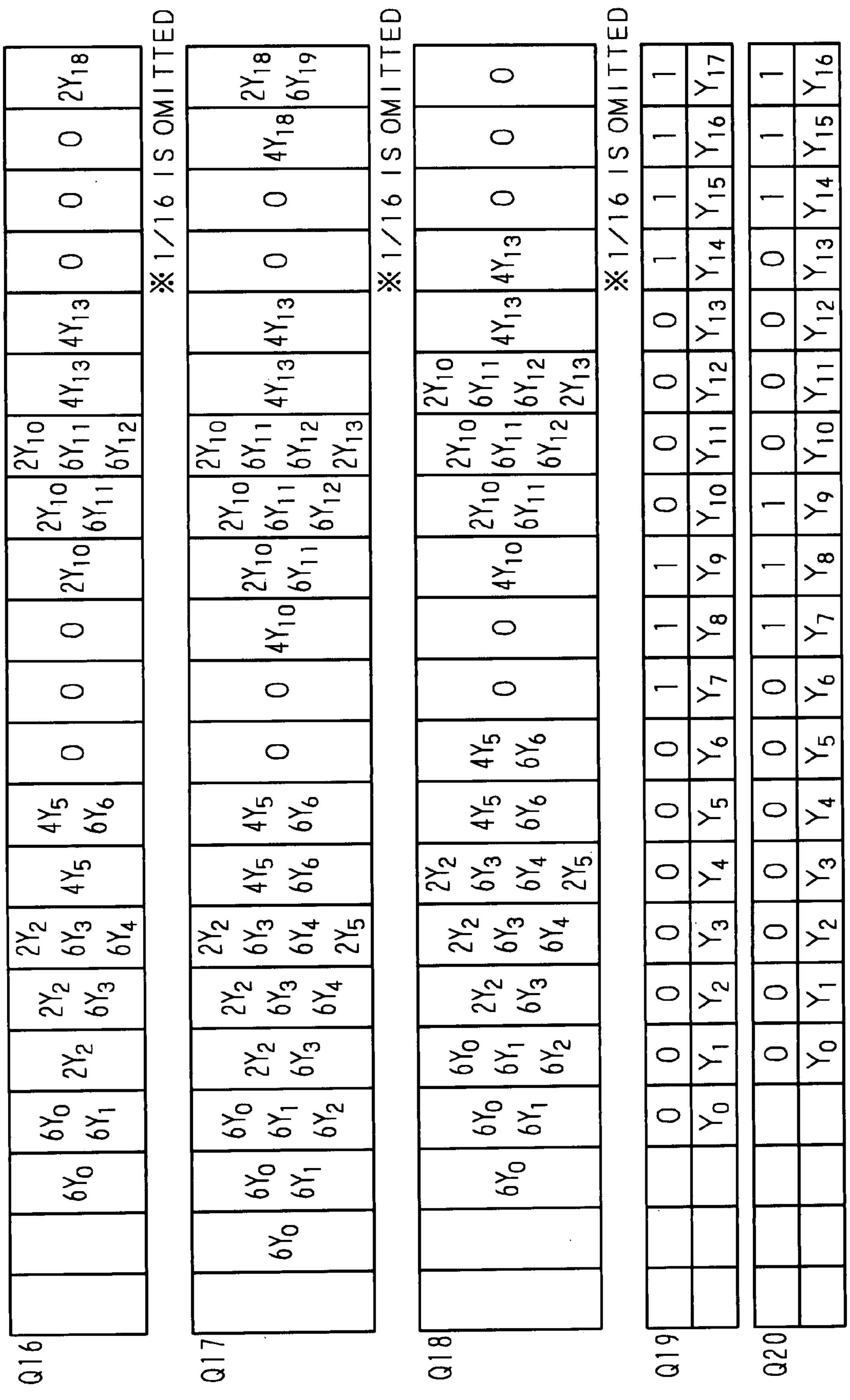

F I G. 6

| | | | | | | | | | | | | | | | | | |
|---|---|---|---|---|---|---|---|---|---|---|---|---|---|---|---|---|---|
| Q16 | | $6Y_0$ | $6Y_0$ $6Y_1$ | $2Y_2$ | $2Y_2$ $6Y_3$ $6Y_4$ | $2Y_2$ $6Y_3$ $6Y_4$ | $4Y_5$ $6Y_6$ | $4Y_5$ $6Y_6$ | 0 | 0 | $2Y_{10}$ | $2Y_{10}$ $6Y_{11}$ $6Y_{12}$ | $4Y_{13}$ | $4Y_{13}$ | 0 | 0 | $2Y_{18}$ | ※1/16 IS OMITTED |

| | | | | | | | | | | | | | | | | | |
|---|---|---|---|---|---|---|---|---|---|---|---|---|---|---|---|---|---|
| Q17 | $6Y_0$ | $6Y_0$ $6Y_1$ | $2Y_2$ $6Y_1$ $6Y_2$ | $2Y_2$ $6Y_3$ $6Y_4$ | $2Y_2$ $6Y_3$ $6Y_4$ | $4Y_5$ $6Y_6$ | $4Y_5$ $6Y_6$ | 0 | $4Y_{10}$ | $2Y_{10}$ $6Y_{11}$ $6Y_{12}$ | $2Y_{10}$ $6Y_{11}$ $6Y_{12}$ $2Y_{13}$ | $4Y_{13}$ | 0 | $4Y_{18}$ | $2Y_{18}$ $6Y_{19}$ | ※1/16 IS OMITTED |

| | | | | | | | | | | | | | | | |
|---|---|---|---|---|---|---|---|---|---|---|---|---|---|---|---|
| Q18 | $6Y_0$ | $6Y_0$ $6Y_1$ | $6Y_0$ $6Y_1$ $6Y_2$ | $2Y_2$ $6Y_3$ $6Y_4$ $2Y_5$ | $2Y_2$ $6Y_3$ $6Y_4$ $2Y_5$ | $4Y_5$ $6Y_6$ | 0 | $4Y_{10}$ | $2Y_{10}$ $6Y_{11}$ $6Y_{12}$ | $2Y_{10}$ $6Y_{11}$ $6Y_{12}$ $2Y_{13}$ | $4Y_{13}$ | 0 | 0 | ※1/16 IS OMITTED |

| | | | | | | | | | | | | | | | | | |
|---|---|---|---|---|---|---|---|---|---|---|---|---|---|---|---|---|---|
| Q19 | | | 0 $Y_0$ | 0 $Y_1$ | 0 $Y_2$ | 0 $Y_3$ | 0 $Y_4$ | 0 $Y_5$ | 0 $Y_6$ | 1 $Y_7$ | 1 $Y_8$ | 1 $Y_9$ | 0 $Y_{10}$ | 0 $Y_{11}$ | 0 $Y_{12}$ | 0 $Y_{13}$ | 1 $Y_{14}$ | 1 $Y_{15}$ | 1 $Y_{16}$ | 1 $Y_{17}$ |

| | | | | | | | | | | | | | | | | | |
|---|---|---|---|---|---|---|---|---|---|---|---|---|---|---|---|---|---|
| Q20 | | | | $Y_0$ | 0 $Y_1$ | 0 $Y_2$ | 0 $Y_3$ | 0 $Y_4$ | 0 $Y_5$ | 0 $Y_6$ | 1 $Y_7$ | 1 $Y_8$ | 1 $Y_9$ | 0 $Y_{10}$ | 0 $Y_{11}$ | 0 $Y_{12}$ | 0 $Y_{13}$ | 1 $Y_{14}$ | 1 $Y_{15}$ | 1 $Y_{16}$ |

| | | | | | | | | | | | | | | | | | | | | |
|---|---|---|---|---|---|---|---|---|---|---|---|---|---|---|---|---|---|---|---|---|
| Q6 | 9 | 2 | 11 | 4 | 13 | 6 | 15 | 8 | 1 | 10 | 3 | 12 | 5 | 14 | 7 | 0 | 9 | 2 | 11 | 4 | 13 |
| Q7 | 0 | 2 | 0 | 4 | 0 | 6 | 0 | 8 | 0 | 1 | 0 | 3 | 0 | 5 | 0 | 7 | 0 | 0 | 2 | 0 | 4 |
| Q8 | 9 | 7 | 9 | 5 | 9 | 3 | 9 | 1 | 8 | 0 | 6 | 0 | 4 | 0 | 2 | 0 | 9 | 7 | 9 | 5 | 0 |
| Q9 | 9 | 7 | 9 | 9 | 9 | 9 | 9 | 8 | 1 | 6 | 9 | 4 | 9 | 2 | 9 | 0 | 9 | 7 | 9 | 9 | 9 |
| Q10 | 0 | 0 | 0 | 0 | 0 | 0 | 0 | 1 | 1 | 0 | 0 | 0 | 0 | 1 | 1 | 0 | 0 | 1 | 1 | 0 | 0 |
| Q11 | $Y_0$ | $Y_1$ | $Y_2$ | $Y_3$ | $Y_4$ | $Y_5$ | $Y_6$ | $Y_7$ | $Y_8$ | $Y_9$ | $Y_{10}$ | $Y_{11}$ | $Y_{12}$ | $Y_{13}$ | $Y_{14}$ | $Y_{15}$ | $Y_{16}$ | $Y_{17}$ | $Y_{18}$ | $Y_{19}$ |
| Q12 | $Y_0$ | $Y_1$ | $Y_2$ | $Y_3$ | $Y_4$ | $Y_5$ | $Y_6$ | 0 | 0 | 0 | $Y_{10}$ | $Y_{11}$ | $Y_{12}$ | $Y_{13}$ | 0 | 0 | 0 | 0 | $Y_{18}$ | $Y_{19}$ |
| | $9Y_0$ | $7Y_1$ | $9Y_2$ | $5Y_3$ | $9Y_4$ | $3Y_5$ | $9Y_6$ | 0 | 0 | 0 | $6Y_{10}$ | $9Y_{11}$ | $4Y_{12}$ | $9Y_{13}$ | 0 | 0 | 0 | 0 | $9Y_{18}$ | $5Y_{19}$ | ※1/16 IS OMITTED |
| Q13 | 0 | 2 | 0 | 4 | 0 | 6 | 0 | 8 | 1 | 0 | 3 | 0 | 5 | 0 | 7 | 0 | 0 | 2 | 0 | 4 |
| Q14 | 0 | $2Y_1$ | 0 | $4Y_3$ | 0 | $6Y_5$ | 0 | 0 | 0 | 0 | $3Y_{10}$ | 0 | $5Y_{12}$ | 0 | 0 | 0 | 0 | 0 | 0 | $4Y_{19}$ | ※1/16 IS OMITTED |
| Q15 | | 0 | $2Y_1$ | 0 | $4Y_3$ | 0 | $6Y_5$ | 0 | 0 | 0 | 0 | $3Y_{10}$ | 0 | $5Y_{12}$ | 0 | 0 | 0 | 0 | 0 | 0 | ※1/16 IS OMITTED |

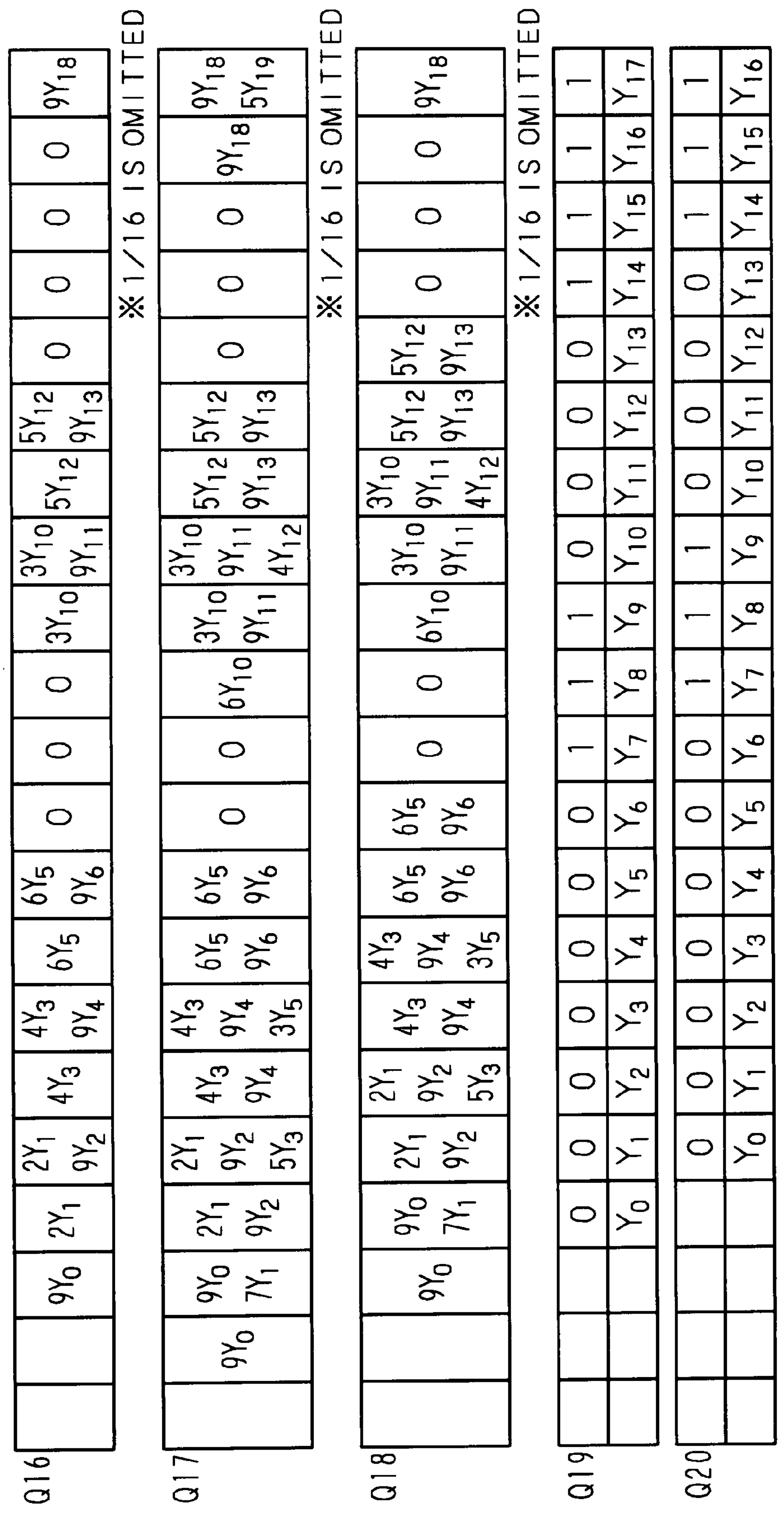

FIG. 10

| | | | | | | | | | | | | | | | | | | |
|---|---|---|---|---|---|---|---|---|---|---|---|---|---|---|---|---|---|---|
| Q16 | | | $9Y_0$ | $2Y_1$ | $2Y_1$ $9Y_2$ | $4Y_3$ $9Y_4$ | $4Y_3$ | $6Y_5$ $9Y_6$ | 0 | 0 | 0 | $3Y_{10}$ | $3Y_{10}$ $9Y_{11}$ | $5Y_{12}$ $9Y_{13}$ | 0 | 0 | 0 | $9Y_{18}$ |

※1/16 IS OMITTED

| | | | | | | | | | | | | | | | | | | |
|---|---|---|---|---|---|---|---|---|---|---|---|---|---|---|---|---|---|---|
| Q17 | | $9Y_0$ | $9Y_0$ $7Y_1$ | $2Y_1$ $9Y_2$ | $2Y_1$ $9Y_2$ $5Y_3$ | $4Y_3$ $9Y_4$ | $4Y_3$ $9Y_4$ $3Y_5$ | $6Y_5$ $9Y_6$ | 0 | 0 | 0 | $3Y_{10}$ | $3Y_{10}$ $9Y_{11}$ $4Y_{12}$ | $5Y_{12}$ $9Y_{13}$ | 0 | 0 | $9Y_{18}$ | $9Y_{18}$ $5Y_{19}$ |

※1/16 IS OMITTED

| | | | | | | | | | | | | | | | | | |
|---|---|---|---|---|---|---|---|---|---|---|---|---|---|---|---|---|---|
| Q18 | | | $9Y_0$ | | $2Y_1$ $9Y_2$ | $2Y_1$ $9Y_2$ $5Y_3$ | $4Y_3$ $9Y_4$ $3Y_5$ | $6Y_5$ $9Y_6$ | $6Y_5$ $9Y_6$ | 0 | 0 | $6Y_{10}$ | $3Y_{10}$ $9Y_{11}$ | $3Y_{10}$ $9Y_{11}$ $4Y_{12}$ | $5Y_{12}$ $9Y_{13}$ | 0 | $9Y_{18}$ |

※1/16 IS OMITTED

| | | | | | | | | | | | | | | | | | | |
|---|---|---|---|---|---|---|---|---|---|---|---|---|---|---|---|---|---|---|
| Q19 | | | | 0 $Y_0$ | 0 $Y_1$ | 0 $Y_2$ | 0 $Y_3$ | 0 $Y_4$ | 0 $Y_5$ | 0 $Y_6$ | 1 $Y_7$ | 1 $Y_8$ | 1 $Y_9$ | 0 $Y_{10}$ | 0 $Y_{11}$ | 0 $Y_{12}$ | 0 $Y_{13}$ | 0 $Y_{14}$ | 1 $Y_{15}$ | 1 $Y_{16}$ | 1 $Y_{17}$ |

| | | | | | | | | | | | | | | | | | | |
|---|---|---|---|---|---|---|---|---|---|---|---|---|---|---|---|---|---|---|
| Q20 | | | | 0 $Y_0$ | 0 $Y_1$ | 0 $Y_2$ | 0 $Y_3$ | 0 $Y_4$ | 0 $Y_5$ | 0 $Y_6$ | 0 $Y_7$ | 1 $Y_8$ | 1 $Y_9$ | 0 $Y_{10}$ | 0 $Y_{11}$ | 0 $Y_{12}$ | 0 $Y_{13}$ | 1 $Y_{14}$ | 1 $Y_{15}$ | 1 $Y_{16}$ |

| Q30 | | | | | | | | | | | | | | | |
|---|---|---|---|---|---|---|---|---|---|---|---|---|---|---|---|
| Q36 | 7 | 14 | 5 | 12 | 3 | 10 | 1 | 8 | 15 | 6 | 13 | 4 | 11 | 2 | 9 | 0 | 7 | 14 | 5 | 12 | 3 |
| Q37 | 0 | 0 | 5 | 0 | 3 | 0 | 1 | 0 | 0 | 6 | 0 | 4 | 0 | 2 | 0 | 0 | 0 | 5 | 0 | 3 |
| Q38 | 7 | 7 | 2 | 7 | 4 | 7 | 6 | 7 | 1 | 7 | 3 | 7 | 0 | 7 | 5 | 7 | 7 | 2 | 7 | 4 |
| Q39 | | 7 | 7 | 2 | 7 | 4 | 7 | 6 | 7 | 1 | 7 | 3 | 7 | 5 | 7 | 7 | 2 | 7 |
| Q40 | | 0 | 0 | 0 | 0 | 0 | 0 | 0 | 1 | 1 | 0 | 0 | 0 | 1 | 1 | 1 | 0 | 0 |
| | $L_0$ | $L_1$ | $L_2$ | $L_3$ | $L_4$ | $L_5$ | $L_6$ | $L_7$ | $L_8$ | $L_9$ | $L_{10}$ | $L_{11}$ | $L_{12}$ | $L_{13}$ | $L_{14}$ | $L_{15}$ | $L_{16}$ | $L_{17}$ | $L_{18}$ | $L_{19}$ |
| Q41 | $L_0$ | $L_1$ | $L_2$ | $L_3$ | $L_4$ | $L_5$ | $L_6$ | $L_7$ | $L_8$ | $L_9$ | $L_{10}$ | $L_{11}$ | $L_{12}$ | $L_{13}$ | 0 | 0 | 0 | 0 | $L_{18}$ | $L_{19}$ |
| Q42 | $7L_0$ | $7L_1$ | $2L_2$ | $7L_3$ | $4L_4$ | $7L_5$ | $6L_6$ | 0 | 0 | 0 | $7L_{10}$ | $3L_{11}$ | $7L_{12}$ | $5L_{13}$ | 0 | 0 | 0 | 0 | $2L_{18}$ | $7L_{19}$ |
| Q43 | 0 | 0 | 0 | 3 | 0 | 1 | 0 | 0 | 6 | 0 | 4 | 0 | 2 | 0 | 0 | 0 | 5 | 0 | ※1/16 IS OMITTED |
| Q44 | 0 | 0 | $5L_2$ | 0 | $3L_4$ | 0 | $L_6$ | 0 | 0 | 0 | $4L_{11}$ | 0 | $2L_{13}$ | 0 | 0 | 0 | $5L_{18}$ | 0 | ※1/16 IS OMITTED |
| Q45 | | 0 | $5L_2$ | 0 | $3L_4$ | 0 | $L_6$ | 0 | 0 | 0 | $4L_{11}$ | 0 | 0 | $2L_{13}$ | 0 | 0 | 0 | 0 | $5L_{18}$ | 0 | ※1/16 IS OMITTED |

| Q46 | | $7L_0$ | $7L_0$ $7L_1$ | $5L_2$ $7L_3$ | $3L_4$ | $L_6$ | $L_6$ | $L_6$ | 0 | $7L_{10}$ | $4L_{11}$ $7L_{12}$ | $2L_{13}$ | 0 | 0 | $5L_{18}$ |
|---|---|---|---|---|---|---|---|---|---|---|---|---|---|---|---|

※1/16 IS OMITTED

| Q47 | | $7L_0$ | $7L_0$ $7L_1$ $2L_2$ | $5L_2$ $7L_3$ $4L_4$ | $3L_4$ $7L_5$ | $L_6$ | $L_6$ | $L_6$ | $7L_{10}$ $3L_{11}$ | $4L_{11}$ $7L_{12}$ $5L_{13}$ | $2L_{13}$ | 0 | 0 | $5L_{18}$ $7L_{19}$ |
|---|---|---|---|---|---|---|---|---|---|---|---|---|---|---|

※1/16 IS OMITTED

| Q48 | | | $7L_0$ $7L_1$ | $5L_2$ $7L_3$ | $3L_4$ $7L_5$ $6L_6$ | $L_6$ | $L_6$ | $L_6$ | $7L_{10}$ | $4L_{11}$ $7L_{12}$ $5L_{13}$ | $2L_{13}$ | 0 | 0 |
|---|---|---|---|---|---|---|---|---|---|---|---|---|---|

※1/16 IS OMITTED

| Q49 | | 0 | 0 | 0 | 0 | 0 | 0 | 1 | 1 | 0 | 0 | 0 | 1 | 1 |
|---|---|---|---|---|---|---|---|---|---|---|---|---|---|---|
| | | $L_0$ | $L_1$ | $L_2$ | $L_3$ | $L_4$ | $L_5$ | $L_6$ | $L_7$ | $L_8$ | $L_9$ | $L_{10}$ | $L_{11}$ | $L_{12}$ | $L_{13}$ | $L_{14}$ | $L_{15}$ | $L_{16}$ | $L_{17}$ |

| Q50 | | | 0 | 0 | 0 | 0 | 0 | 0 | 1 | 1 | 0 | 0 | 0 | 1 | 1 |
|---|---|---|---|---|---|---|---|---|---|---|---|---|---|---|---|
| | | | $L_0$ | $L_1$ | $L_2$ | $L_3$ | $L_4$ | $L_5$ | $L_6$ | $L_7$ | $L_8$ | $L_9$ | $L_{10}$ | $L_{11}$ | $L_{12}$ | $L_{13}$ | $L_{14}$ | $L_{15}$ | $L_{16}$ |

SIGNAL PROCESSING DEVICE, AND IMAGE OUTPUT DEVICE

CROSS-REFERENCE TO RELATED APPLICATIONS

This application is the national phase under 35 U.S.C. §371 of PCT International Application No. PCT/JP05/018971 which has an International filing date of Oct. 14, 2005 and designated the United States of America.

BACKGROUND

1. Field of the Invention

The present invention relates to a signal processing device for changing a resolution of a synthesized image signal obtained by synthesizing two image signals. Also, the present invention relates to an image output device outputting a plurality of synthesized image signals with different resolutions, by using such a signal processing device.

2. Description of Related Art

A conventionally known image output device is constituted so as to simultaneously output a plurality of synthesized image signals with different resolutions, by synthesizing a first image signal as a character signal such as an OSD signal for performing OSD (On Screen Display) display of channel information, time information, and menu, etc, and a second image signal as an original image signal. As an example, such a conventional image output device includes a first character signal creating unit for creating a first character signal with first resolution (such as 1920×1080 pixels); a second character signal creating unit for creating a second character signal with second resolution (such as 720×480 pixels); a first synthesizing unit for synthesizing the first character signal into the image signal with first resolution; a second synthesizing unit for synthesizing the second character signal into the image signal with second resolution; a first output unit for outputting a signal synthesized by the first synthesizing unit; and a second output unit for outputting a signal synthesized by the second synthesizing unit. Then, such a conventional image output device is adapted to create two character signals with different resolutions respectively in the first character signal creating unit and the second character signal creating unit, and synthesize these character signals with the image signal with each resolution, in the first synthesizing unit and the second synthesizing unit.

However, in the aforementioned conventional image output device, a plurality of character signal creating units (the first character signal creating unit and the second character signal creating unit) are required, for every resolution to create the character signal, and also a plurality of synthesizing units (the first synthesizing unit and the second synthesizing unit) for synthesizing the character signal with each resolution are required. Accordingly, there is a problem that the device is upsized and a cost is increased.

Therefore, the image output device is proposed, including the character signal creating unit for creating the character signal with first resolution; the synthesizing unit for synthesizing the character signal into the image signal with first resolution; the first output unit for outputting the synthesized image signal with first resolution synthesized by this synthesizing unit; a resolution changing unit for changing the resolution of the synthesized image signal with first resolution synthesized by the aforementioned synthesizing unit to the second resolution; and the second output unit for outputting the synthesized image signal with second resolution, with the resolution changed by the resolution changing unit, wherein the character signal and the image signal both having the same resolution are synthesized and the synthesized image signal is created, and thereafter the resolution of the synthesized image signal is changed.

For example, Japanese Patent Application Laid-Open No. H10-20847 discloses the image processing device wherein regarding the pixel at a specific position, a constituent pixel of an input image is used as it is, and regarding the pixel at a position other than the specific position, a pixel value is calculated based on the pixel value of the constituent pixel of the input image, and both pixels are synthesized to create the output image. More specifically, this image processing device includes calculating means for determining the pixel value of the pixel at the position other than the specific position, by multiplying the pixel value of the constituent pixel of the input image by a conversion coefficient expressed by a sum of power of 2; and output image creating means for creating the output image by synthesizing the pixel at the specific position (the constituent pixel of the input image as it is) and the pixel at the position other than the specific position with the pixel value determined by the calculating means.

According to a technique disclosed in the aforementioned Japanese Patent Application Laid-Open No. H10-20847, the conversion coefficient expressed by the sum of power of 2 is used. Therefore, by the changeover of the conversion coefficient, sharpness of the output image can be easily switched, and also the aforementioned calculating means can be constituted by a simple hardware such as shift resister, thus making it possible to reduce a manufacturing cost.

However, according to a technique disclosed in Japanese Patent Application Laid-Open No. H10-20847, during processing of changing the resolution of the image signal obtained by synthesizing a character signal such as an OSD signal, the resolution of the character signal is also changed. Therefore, the character signal and the image signal are mixed, thus involving a problem of bleeding in the image of the character signal.

SUMMARY

In view of the above-described circumstances, the present invention is provided, and an object of the present invention is to provide a signal processing device capable of realizing a down-size and a low cost compared to a conventional signal processing device, and capable of changing resolution of an synthesized image signal without bleeding in a image of a first image signal (such as a character signal) contained in the synthesized image signal. Also, another object of the present invention is to provide an image output device capable of simultaneously outputting a plurality of synthesized image signals with different resolutions to a plurality of display devices so as to be displayed thereon, by using such a signal processing device and changing the resolution of the synthesized image signal to a different resolution.

The signal processing device according to one aspect is characterized by a signal processing device for changing a resolution of a synthesized image signal obtained by synthesizing a first image signal and a second image signal, characterized by comprising: first separating means for separating the synthesized image signal into a third image signal containing a component of the first image signal and a fourth image signal containing no component of the first image signal based on presence/absence of the first image signal;

resolution changing means for changing both resolutions of the third image signal and fourth image signal separated by the first separating means to the same resolutions; and synthesizing means for synthesizing the third image signal and the fourth image signal with the resolutions changed to the same resolutions by the resolution changing means.

In the aforementioned signal processing device according to the one aspect, during processing of changing the resolution of the synthesized image signal obtained by synthesizing a first image signal and a second image signal, based on the presence/absence of the first image signal, the synthesized image signal is separated into a third image signal containing a component of the first image signal and a fourth image signal containing no component of the first image signal. Then, the separated third image signal and fourth image signal are changed to the same resolution, and thereafter the third image signal and the fourth image signal are synthesized. Accordingly, during processing of changing the resolution of the synthesized image signal obtained by synthesizing the first image signal and the second image signal, the component of the first image signal and the component of the second image signal are not mixed.

Further, in the signal processing device of the above aspect, the signal processing device according to the other aspect is characterized in that identification information for identifying whether or not the first image signal is contained is added to the synthesized image signal, and the first separating means determines the presence/absence of the first image signal based on the identification information.

According to the aforementioned signal processing device of the other aspect, during processing of changing the resolution of the synthesized image signal obtained by synthesizing the first image signal and the second image signal, based on identification information for identifying whether or not the first image signal is contained, the synthesized image signal is separated into the third image signal containing the component of the first image signal and the fourth image signal containing no component of the first image signal. Then, the resolution of each of the separated third image signal and fourth image signal is changed to the same resolution, and thereafter the third image signal and the fourth image signal are synthesized based on the identification information. Thus, during the processing of changing the resolution of the synthesized image signal obtained by synthesizing the first image signal and the second image signal, the synthesized image signal can be easily separated into the third image signal and the fourth image signal, because whether or not the first image signal is contained is identified by the identification information, and also separation error is prevented from occurring. Accordingly, during processing of changing the resolution of the synthesized image signal obtained by synthesizing the first image signal and the second image signal, the component of the first image signal and the component of the second image signal are not mixed.

Further, in the signal processing device of the above aspect, the signal processing device according to the other aspect is characterized by further comprising information adding means for adding identification information for identifying whether or not the first image signal is contained, to the synthesized image signal based on presence/absence of the first image signal, wherein the first separating means determines the presence/absence of the first image signal based on the identification information.

According to the aforementioned signal processing device of the other aspect, during processing of changing the resolution of the synthesized image signal obtained by synthesizing the first image signal and the second image signal, the identification information for identifying whether or not the first image signal is contained is added to the synthesized image signal based on the presence/absence of the first image signal. Therefore, the synthesized image signal is surely separated into the third image signal containing the component of the first image signal and the fourth image signal containing no component of the first image signal, based on the identification information. Then, the resolution of each of the separated third image signal and fourth image signal is changed to the same resolution, and thereafter the third image signal and the fourth image signal are synthesized based on the identification information. Thus, during processing of changing the resolution of the synthesized image signal obtained by synthesizing the first image signal and the second image signal, the identification information can be added to the synthesized image signal based on the presence/absence of the first image signal at the signal processing device side, even when the synthesized image signal is inputted, with no identification information added. Therefore, the synthesized image signal can be surely separated into the third image signal and the fourth image signal by the identification information. In addition, when the synthesized image signal is inputted, with the identification information added, the aforementioned processing of changing the resolution can be performed based on the identification information.

Further, in any one of the signal processing devices of the above respective aspects, the signal processing device according to the other aspect is characterized in that the resolution changing means comprises: second separating means for separating the fourth image signal into two systems; first multiplying means for multiplying the fourth image signal of one system separated by the second separating means by a predetermined coefficient; second multiplying means for multiplying the fourth image signal of the other system separated by the second separating means by a complement of the predetermined coefficient; delay means for delaying the fourth image signal of the one system multiplied by the first multiplying means; and adding means for adding the fourth image signal of the other system multiplied by the second multiplying means and the one fourth image signal delayed by the delay means.

In the aforementioned signal processing device of the other aspect according to any one of the signal processing device of each aspect, one of the fourth image signal separated into two systems is multiplied by a predetermined coefficient, and the other of the fourth image signal is multiplied by a complement of a predetermined coefficient and delayed. Then, by adding these two signals, the fourth image signal is re-configured through smoothing processing.

Further, in the signal processing device of the above aspect, the signal processing device according to the other aspect is characterized in that the resolution changing means further comprises delay means for delaying the third image signal according to a delay amount generated by processing of changing a resolution of the fourth image signal.

In the aforementioned signal processing device of the other aspect according to the signal processing device of the above aspect, the third image signal is delayed according to a delay amount generated by the change of the resolution of the fourth image signal. Therefore, a frame position of the third image signal is not deviated by the change of the resolution.

Further, in either of the signal processing devices of the above aspects, the signal processing device according to the other aspect is characterized by further comprising: receiving means for receiving a change rate of the resolution; and calculating means for calculating the predetermined coefficient according to the change rate received by the receiving means.

In the aforementioned signal processing device of the aspect according to any one of the above aspects, the coefficient of the smoothing processing is calculated according to the change rate of the received resolution. Therefore, the number of the peripheral pixels to be subjected to smoothing processing is suitably changed according to the change rate of the resolution.

Further, the image output device according to one aspect is characterized by An image output device for changing a first synthesized image signal with first resolution having a first image signal and a second image signal synthesized, to a second synthesized image signal with second resolution different from the first resolution, and outputting the first synthesized image signal and second synthesized image signal, characterized by comprising: a first output unit for outputting the first synthesized image signal; a signal processing device including: first separating means for separating the first synthesized image signal into a third image signal containing a component of the first image signal and a fourth image signal containing no component of the first image signal based on presence/absence of the first image signal; resolution changing means for changing both resolutions of the third image signal and fourth image signal separated by the first separating means to the same second resolutions; and synthesizing means for synthesizing the third image signal and the fourth image signal with the resolutions changed to the same second resolutions by the resolution changing means; and a second output unit for outputting the second synthesized image signal with the second resolution synthesized by the synthesizing means.

According to the aforementioned image output device of the one aspect, by any one of the aforementioned signal processing apparatuses of each aspect, the resolution of the synthesized image signal with first resolution having the first image signal and the second image signal synthesized with first resolution is changed to the second resolution and is outputted, and also the synthesized image signal with first resolution is outputted.

According to the aforementioned image output device, during processing of changing the resolution of the synthesized image signal obtained by synthesizing the first image signal such as a character signal and the second image signal such as a normal image signal, the third image signal containing the component of the first image signal and the fourth image signal containing no component of the first image signal are not mixed. Accordingly, when a finally synthesized image signal is displayed as the image, a sharp synthesized image can be obtained, without bleeding in each image displayed by the first image signal and the second image signal, by the other image.

According to the aforementioned image output device, during the processing of changing the resolution of the synthesized image signal obtained by synthesizing the first image signal such as a character signal and the second image signal such as a normal image signal, the synthesized image signal can be easily separated into the third image signal and the fourth image signal by identifying whether or not the first image signal is contained by the identification information. Accordingly, when the finally synthesized image signal is displayed as the image, the sharp synthesized image can be obtained without bleeding by the other image in each image displayed by the first image signal and the second image signal.

According to the aforementioned image output device, during the processing of changing the resolution of the synthesized image signal obtained by synthesizing the first image signal such as the character signal and the second image signal such as the normal image signal, even when the synthesized image signal is inputted, with no identification information added, the identification information is added to the synthesized image signal based on the presence/absence of the first image signal. Therefore, the synthesized image signal is surely separated into the third image signal and the fourth image signal by this identification information. In addition, when the synthesized image signal is inputted, with the identification information added, as described above, the processing of changing the resolution can be performed. Accordingly, in any case, when the finally synthesized image signal is displayed as the image, the sharp synthesized image can be obtained without bleeding in each image displayed by the first image signal and the second image signal, by the other image.

In the signal processing device of each aspect according to the aforementioned signal processing device, the component of each pixel configuring the fourth image signal is added with the component of the peripheral pixel of this pixel, and is smoothened. Therefore, the image displayed by the finally synthesized image signal has a smooth impression.

In the signal processing device of each aspect according to the aforementioned signal processing device, the third image signal is delayed according to the delay amount generated by the change of the resolution of the fourth image signal. Therefore, it is possible to prevent the deviation of the frame position of the third image signal by changing the resolution, and the sharp synthesized image can be obtained as the image displayed by the finally synthesized image signal.

In the signal processing device of each aspect according to the aforementioned signal processing device, the number of the peripheral pixels to be subjected to smoothing processing can be suitably changed according to the change rate of the resolution. Therefore, the smoothing processing can be performed corresponding to any kind of change rate.

According to the aforementioned image output device, by any one of the aforementioned signal processing apparatuses of each aspect, even when the resolution of the synthesized image signal with first resolution, having the first image signal and the second image signal with first resolutions synthesized, is changed to the second resolution, the same image signal can be outputted to a plurality of display devices with different resolutions and can be simultaneously displayed thereon, by outputting the synthesized image signal with first resolution and the synthesized image signal with second resolution individually.

The above and further objects and features of the invention will more fully be apparent from the following detailed description with accompanying drawings.

BRIEF DESCRIPTION OF THE SEVERAL VIEWS OF THE DRAWINGS

FIG. 3 is a block diagram showing a constitutional example of a horizontal contraction filter;

FIG. 6 is a timing chart showing the timing of the output signal of each constituent element of the horizontal contraction filter;

FIG. 10 is a timing chart showing other timing of the output signal of each constituent element of the horizontal contraction filter;

DETAILED DESCRIPTION

Figure 1:
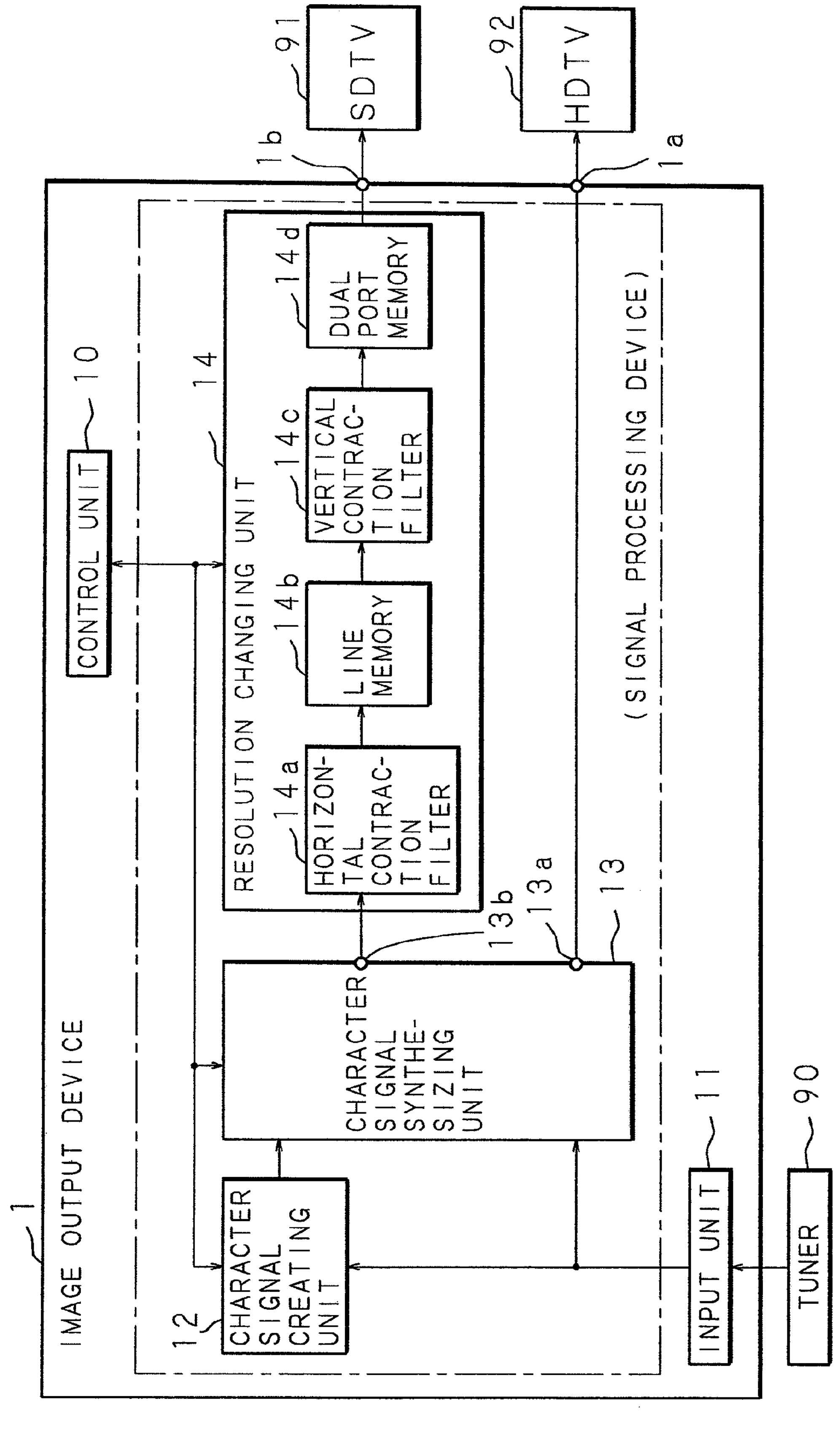
FIG. 1 is a block diagram showing an outline structure of an image output device according to the present invention.

Preferred embodiments of the present invention will be described in detail hereunder, based on the drawings. FIG. 1 is a block diagram showing an outline structure of an image output device according to the present invention.

An image output device 1 according to the present invention includes a control unit 10, an input unit 11, a character signal creating unit 12, a character signal synthesizing unit 13, and a resolution changing unit 14, or the like. In FIG. 1, a signal processing device according to the present invention includes constituent elements contained in a range surrounded by one-dot chain line, namely, the character signal creating unit 12, the character signal synthesizing unit 13 and the resolution changing unit 14. Specifically, the control unit 10 is constituted of a CPU, and is connected to each part of the aforementioned hardware of the image output device 1, so as to control it. A reproduction device such as a Blue-ray Disc player and a hard disc player, or an image signal output device (a tuner 90 in this case) such as a digital high vision tuner is connected to the input unit 11, and an image signal (the second image signal) that complies with an HDTV format (SMPTE: 274 M/296 M) is inputted. The image signal inputted to the input unit 11 is constituted of a luminance signal Y with 8 bits or 10 bits and a digital point sequential color difference signal CB/CR, and the resolution thereof is 1920×1080 pixels or 1280×720 pixels. In addition, the image output device 1 creates the synthesized image signal obtained by synthesizing the image signal to be inputted from the input unit 11 and the character signal (the first image signal), and outputs the synthesized image signal (the first synthesized image signal) thus obtained as it is and also outputs the synthesized image signal (the second synthesized image signal) with resolution changed to 720×480 pixels.

The control unit 10 determines what image signal is inputted with what resolution, by separating a synchronization signal superposed on the image signal inputted from the input unit 11, and detecting its frequency, namely, a horizontal frequency and a vertical frequency. The control unit 10 calculates a magnification (change rate) during the processing of changing the resolution performed by the resolution changing unit 14 from the determined resolution of the image signal. For example, when it is determined that the image signal with resolution set to 1920×1080 pixels is inputted, the control unit 10 calculates a horizontal magnification (720/1920) and a vertical magnification (480/1080) required for changing the aforementioned resolution to 720×480 pixels. The control unit 10 outputs a magnification signal for identifying the horizontal magnification and the vertical magnification thus calculated, to the character signal creating unit 12 and the resolution changing unit 14.

The character signal creating unit 12 creates the character signal with the same resolution as the resolution of this image signal, in synchronization with the image signal inputted from the input unit 11. The character signal creating unit 12 determines a minimum size of the pixel constituting a character, based on the magnification signal given from the control unit 10. For example, in a case of the image with the horizontal resolution 1920 pixels being reduced to 720 pixels, an integer “3” obtained by rounding up the inverse number (1920/720) of 720/1920 shown by the horizontal magnification signal is a horizontal minimum size. Similarly, in a case of the image with the vertical resolution of 1080 pixels being reduced to 480 pixels, the integer “3” obtained by rounding up the inverse number (1080/480) of 480/1080 shown by a vertical magnification signal is a vertical minimum size.

In addition, the character signal creating unit 12 outputs a signal in synchronization with the image signal inputted from the input unit 11. However, the character signal creating unit 12 adds the identification information for identifying a character signal with 1 bit (for example, “1” when the signal is identified as a character signal, while “0” when the signal is not identified as the character signal) to the character signal, and the character signal thus added with the identification information is outputted to the character signal synthesizing unit 13. Note that the character signal is a signal capable of creating a character or a graphic of an arbitrary size in a range of the image of an HDTV format, like the OSD signal for performing OSD display of the channel information, time information, and menu, or the like on a monitor. For example, the character signal creating unit 12 secures a data area of pixels corresponding to the HDTV format in an image memory, writes arbitrary data in this data area, and outputs the data thus written in synchronization with a frame pulse of the image signal. Accordingly, the image signal inputted from the input unit 11 and the character signal created by the character signal creating unit 12 have the same resolutions.

Figure 2:
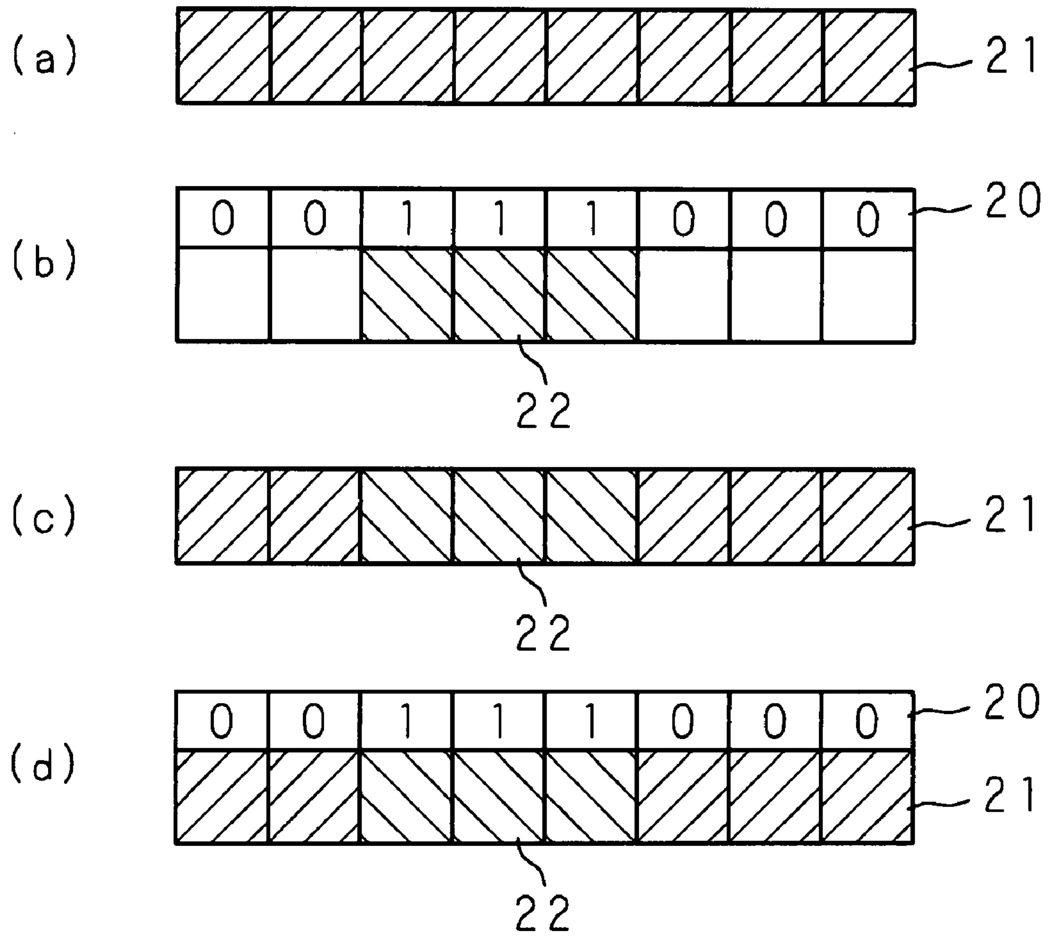
FIG. 2 are explanatory views for explaining an image signal created by a character signal synthesizing unit.
Figure 4:
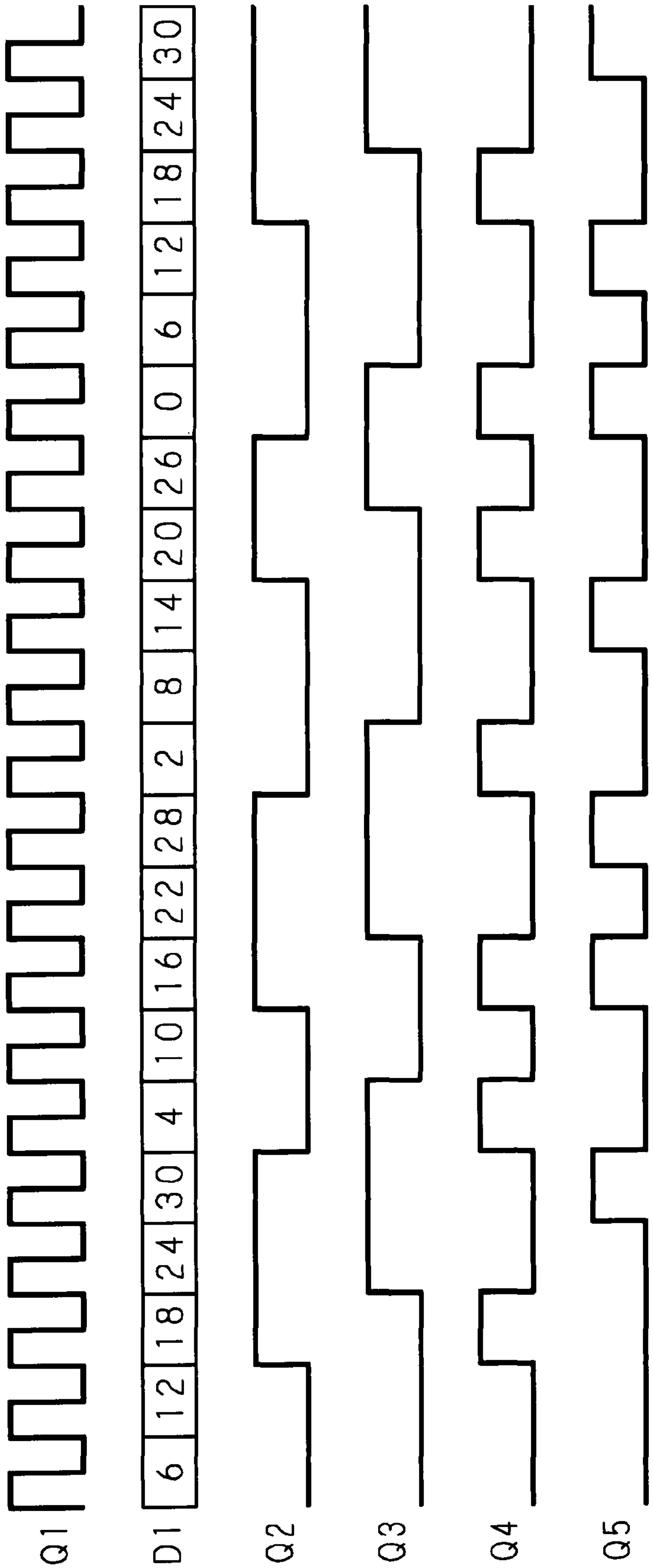
FIG. 4 is a timing chart showing a timing of an output signal of each constituent element of the horizontal contraction filter.

The character signal synthesizing unit 13 synthesizes an image signal 21 inputted from the input unit 11 as shown in FIG. 2(*a*), and a character signal 22 (to which the aforementioned identification information of “1” is added) created by the character signal creating unit 12 as shown in FIG. 2(*b*). Note that the image signal 21 and the character signal 22 have the same resolutions. Then, based on identification information 20 added to the character signal 22, the character signal synthesizing unit 13 selects one of the image signal 21 and the character signal 22, and outputs it as the synthesized image signal. More specifically, the character signal synthesizing unit 13 outputs the image signal 21 inputted from the input unit 11 as the synthesized image signal, when the identification information 20 is not “1”, namely, when the identification information 20 is “0”, and when the identification information 20 is “1”, outputs the character signal 22 created by the character signal creating unit 12 as the synthesized image signal. In addition, the character signal synthesizing unit 13 is provided with two output units 13*a* and 13*b*. The output unit 13*a* outputs the synthesized image signal as shown in FIG.

2(*c*) from which the identification information 20 is removed after the signal is selected as described above. The synthesized image signal outputted from this output unit 13*a* is outputted to outside from the first output unit 1*a* of the image output device 1. Meanwhile, the other output unit 13*b* outputs the synthesized image signal as shown in FIG. 2(*d*) from which the identification information 20 is not removed after the signal is selected as described above. The synthesized image signal outputted from this output unit 13*b* is inputted to the resolution changing unit 14. Namely, the character signal creating unit 12 and the character signal synthesizing unit 13 function as information adding means for adding to the synthesized image signal the identification information 20 for identifying whether or not the character signal 22 is contained.

The resolution changing unit 14 includes a horizontal contraction filter 14*a*, a line memory 14*b*, a vertical contraction filter 14*c*, a dual-port memory 14*d*, and so forth. The synthesized image signal as shown in FIG. 2(*d*) is inputted in the resolution changing unit 14, which is synthesized by the character signal synthesizing unit 13 without removing the identification information. The resolution changing unit 14 changes its resolution based on the synthesized image signal thus inputted. Also, the resolution changing unit 14 identifies the horizontal magnification and the vertical magnification based on the magnification signal given from the control unit 10, and changes the resolution even when the image signal with any kind of resolution is inputted.

In the resolution changing unit 14, first, a horizontal contraction processing is applied to the inputted synthesized image signal (high vision signal) by the horizontal contraction filter 14*a*, and a result thus obtained is stored in the line memory 14*b*. Next, the synthesized image signal contracted in a horizontal direction is read from the line memory 14*b*, a vertical contraction processing is applied thereto by the vertical contraction filter 14*c*, and the result thus obtained is stored in the dual-port memory 14*d*. Then, the synthesized image signal (NTSC/PAL signal) contracted in the horizontal direction and the vertical direction respectively is read from the dual-port memory 14*d*, and then is outputted to the outside from the second output unit 1*b* of the image output device 1.

Accordingly, the image output device 1 creates the synthesized image signal by synthesizing the image signal inputted from the input unit 11 and the character signal by the character signal synthesizing unit 13, outputs this synthesized image signal from the first output unit 1*a* as the first synthesized image signal with the same resolution as the resolution of the inputted image signal, and simultaneously outputs from the second output unit 1*b* the image signal with the resolution changed by the resolution changing unit 14, as the second synthesized image signal. Namely, for example, when the input image signal has the resolution of 1920×1080 pixels, the synthesized image signal with resolution of 1920×1080 pixels (the same resolution as the resolution of the input image signal) is outputted from the first output unit 1*a* of the image output device 1, and the synthesized image signal with the resolution contracted to 720×480 pixels is outputted from the second output unit 1*b*. Accordingly, an HDTV 91 is connected to the first output unit 1*a*, and an SDTV 92 is connected to the second output unit 1*b*.

Next, an example of the constitutions of the horizontal contraction filter 14*a* is explained with reference to the drawings. FIG. 3 is a block diagram showing a constitutional example of the horizontal contraction filter. First, in the horizontal contraction filter 14*a*, explanation is given to a case that the pixels in the horizontal direction are contracted from 1920 pixels to 720 pixels, with reference to a timing chart showing the timing of the output signal of each constitutional element of the horizontal contraction filter 14*a* as shown in FIG. 4, FIG. 5, FIG. 6, and FIG. 7.

The horizontal contraction filter 14*a* includes a counter 50, selectors 51, 52, 53, 54, 55, an exclusive logical sum circuit (XOR circuit) 56, a subtraction circuit 57, multiplier circuits 58, 59, an adding circuit 60, delay circuits (for one-clock delay) 61, 62, 63, 64, 65, 66, and delay circuits (for two-clock delay) 67, 68 or the like.

A clock signal Q1, a horizontal synchronization signal, and a magnification signal are inputted in the counter 50. The horizontal synchronization signal is used for resetting an internal counter value D1 of the counter 50. Note that the horizontal synchronization signal is obtained by separating the synchronization signal (containing the horizontal synchronization signal and the vertical synchronization signal) superposed on the image signal, and further separating this synchronization signal into the horizontal synchronization signal and the vertical synchronization signal. The counter 50 increments the internal counter value D1 by a unit of magnification N, in synchronization with the clock signal Q1 (see FIG. 4). The magnification N is calculated from the magnification signal given from the control unit 10. Specifically, the magnification N can be calculated by the following formula (1), using a horizontal resolution H1 of the inputted synthesized image signal, a horizontal resolution H2 of the synthesized image signal to be outputted and a base $2^x$ of the counter 50. In order to simplify the explanation, the explanation will be given hereunder for the case of H1=1920, H2=720, and X=4. Note that, in this case, the magnification N is "6". However, bit number K of the counter 50 is obtained by adding 1 bit to the bit number X of the base $2^x$ of division. In this embodiment, the base is 16 (X=4), and the bit number K is 5.

$$N=(H2/H1)\times 2^x \qquad (1)$$

wherein H2/H1 is the magnification in the horizontal direction.

The counter 50 outputs the value of the most significant bit of the internal counter value D1 to the delay circuit 61 and the XOR circuit 56 as a signal Q2. The delay circuit 61 delays the inputted signal Q2 by one clock, and outputs it to the XOR circuit 56 as a signal Q3. The XOR circuit 56 performs exclusive logical sum operation of the inputted signal Q2 and signal Q3, and outputs this result to the delay circuit 67 and the selector 51 as a signal Q4. The delay circuit 67 delays the inputted signal Q4 by two clocks, outputs it to the selector 53 as a signal Q5, and also outputs it to the line memory 14*b* as a validity discrimination signal (regarding the above, see FIG. 4). Note that the signal Q4 is a control signal for determining a selection timing of the signal in the selector 51 and determining which inputted signal is selected and outputted, and the signal Q5 is the control signal for determining the selection timing of the signal in the selector 53 and determining which inputted signal is selected and outputted.

The counter 50 sets the value of 4 bits of lower-order of the internal counter value D1 as a signal Q6, and outputs it to the selector 51. The aforementioned signal Q6 of 4 bits and a low level signal, with all bits set to "0", are given to the selector 51 as an input signal, and the output signal is selected, with the signal Q4 as the control signal. Specifically, the selector 51 selects the signal Q6 when the signal Q4 is "1", and selects the signal of low level, with all bits set to "0", when the signal Q4 is "0", and outputs the selected signal to the subtraction circuit 57 and the delay circuit 63 as a signal Q7.

The aforementioned magnification signal is inputted in the subtraction circuit 57, other than the signal Q7. The subtraction circuit 57 outputs the result obtained by subtracting the signal Q7 from the magnification signal ("6" in this case) to the delay circuit 62 as a signal Q8. The delay circuit 62 delays the inputted signal Q8 by one clock and outputs it to the multiplier circuit 58 as a signal Q9.

A synthesized image signal Q10 and a low level signal, with all bits set to "0", are given as an input signal to the selector 52 from the output unit 13*b* of the character signal synthesizing unit 13. More specifically, the identification information of 1 bit of the synthesized image signal Q10 is inputted to the selector 52 as the control signal, and a part other than the identification information is inputted to the selector 52 as the signal to be selected, respectively. Then, the selector 52 selects the signal other than the identification information for the signal Q10 when the identification information for the signal Q10 is "0", and selects the low level signal, with all bits set to "0", when the identification information for the signal Q10 is "1", and outputs the selected signal to the multiplier circuits 58 and 59 as a signal Q11. Note that when the identification information for the signal Q10 is "0", no component of the character signal is contained in the signal Q10. Accordingly, no component of the character signal is contained in the signal Q11. Meanwhile, when the identification information for the signal Q10 is "1", the component of the character signal is contained in the signal Q10. However, in this case, all bits of the signal Q11 are "0", and therefore no component of the character signal is contained. As described above, the signal Q10 corresponds to the third image signal containing the component of the first image signal (character signal), and the signal Q11 corresponds to the fourth image signal containing no component of the first image signal (character signal), respectively. The multiplier circuit 58 outputs the result obtained by multiplying the signal Q11 and the signal Q9 to the adding circuit 60 as a signal Q12.

The delay circuit 63 delays the inputted signal Q7 by one clock, and outputs it to the multiplier circuit 59 as a signal Q13. The multiplier circuit 59 outputs the result obtained by multiplying the signal Q11 and the signal Q13 to the delay circuit 64 as a signal Q14. As is clarified from a creation process of the signal Q12 and the signal Q14, in the multiplier circuit 59, the signal Q11 is multiplied by the coefficient based on the magnification signal to create the signal Q14, and in the multiplier circuit 58, the signal Q11 is multiplied by the complement of the coefficient based on the magnification signal to create the signal Q12. Accordingly, the multiplier circuit 59 functions as first multiplying means according to the present invention and the multiplier circuit 58 functions as second multiplying means according to the present invention. Note that the signals Q12 and Q14 outputted from these multiplier circuits 58 and 59 are added by the adding circuit 60 as will be described later and are subjected to smoothing processing.

Figure 5:
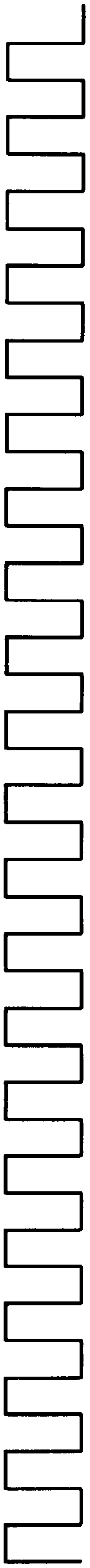
FIG. 5 is a timing chart showing the timing of the output signal of each constituent element of the horizontal contraction filter.

The delay circuit 64 delays the inputted signal Q14 by one clock, and outputs it to the selector 53 as a signal Q15 (regarding the above, see FIG. 5). The signal Q18 as will be described later is also inputted in the selector 53 other than the signal Q15 as the signal to be selected, and the output signal is selected, with the aforementioned signal Q5 as the control signal. Specifically, the selector 53 selects the signal Q15 when the signal Q5 is "1", and selects the signal Q18 when the signal Q5 is "0", and outputs the selected signal to the adding circuit 60 as a signal Q16. The adding circuit 60 outputs the result obtained by adding the signal Q12 and the signal Q16 to the delay circuit 65 as a signal Q17. The delay circuit 65 delays the inputted signal Q17 by one clock, and outputs it to the selector 53 and the selector 55 as the signal Q18. Accordingly, the selector 53, the adding circuit 60, and the delay circuit 65 constitute a feedback loop.

The delay circuit 68 delays the inputted synthesized image signal Q10 by two clocks, and outputs it to the delay circuit 66 and the selector 54 as a signal Q19. The delay circuit 66 delays the inputted signal Q19 by one clock, and outputs it to the selector 54 as a signal Q20 (regarding the above, see FIG. 6). The horizontal magnification signal given from the control unit 10 is inputted in the selector 54 as the control signal. The selector 54 selects the signal Q20 when the integer obtained by rounding up the value shown by the magnification signal is "3", and selects the signal Q19 when this integer is "2", and outputs the selected signal to the selector 55 as a signal Q21. Namely, the delay amount of the character signal is changed respectively according to the magnification so that when the integer obtained by rounding up the value shown by the magnification signal is "3", the delay amount of the character signal is 3 clocks and when this integer is "2", the delay amount of the character signal is two clocks. In this embodiment, the integer is "3", and therefore the selector 54 selects and outputs the signal Q20. Namely, the character signal is delayed according to the delay amount generated by the processing of changing the resolution of the image signal. Note that the signal Q21 outputted from the selector 54 is the signal obtained by applying only delay processing to the synthesized image signal Q10, and therefore the identification information is added thereto.

The identification information of 1 bit added to the signal Q21 is inputted in the selector 55 as the control signal, and the signal Q21 containing the identification information is inputted in the selector 55 as the signal to be selected, respectively. Accordingly, the selector 55 selects the output signal, with the identification information added to the signal Q21, as the control signal. Specifically, the selector 55 selects the signal Q21 when the identification information added to the signal Q21 is "1", namely when the component of the character signal is contained in the signal Q21. Meanwhile, the selector 55 selects the signal Q18 when the identification information added to the signal Q21 is "0", namely when no component of the character signal is contained in the signal Q21. The signal thus selected by the selector 55 is outputted to the outside (line memory 14*b*) as the signal Q22 (regarding the above, see FIG. 7). In this way, from the horizontal contraction filter 14*a*, the signal Q22 is outputted to the line memory 14*b* as the output signal, and the signal Q5 is outputted to the line memory 14*b* as the validity discrimination signal, respectively.

Figure 7:
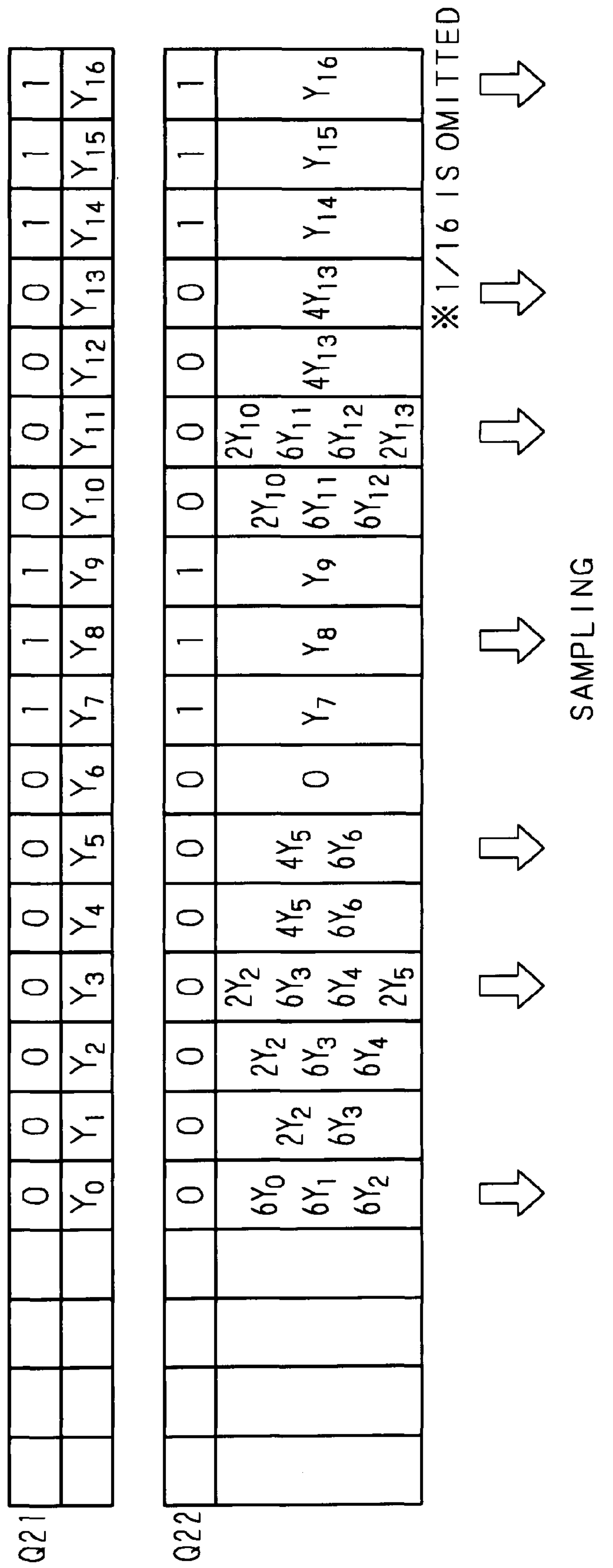
FIG. 7 is a timing chart showing the timing of the output signal of each constituent element of the horizontal contraction filter.
Figure 8:
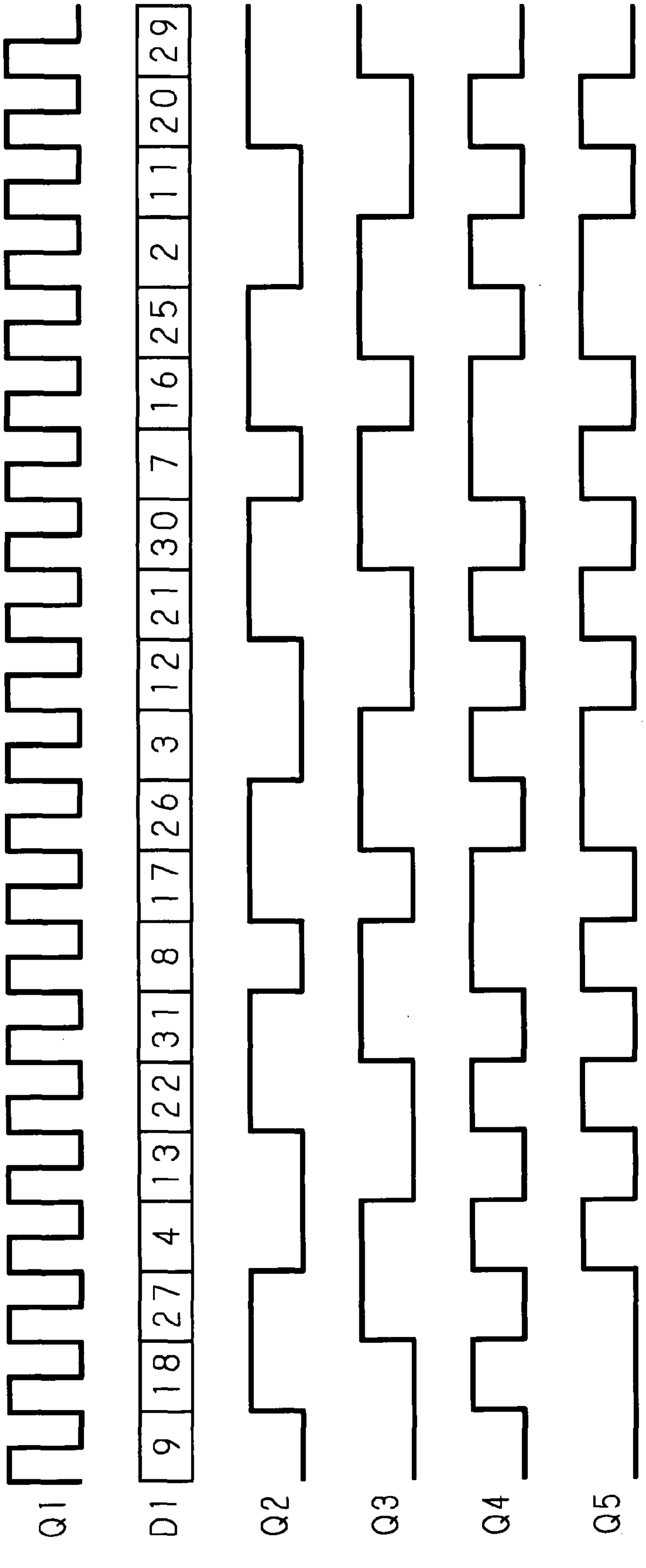
FIG. 8 is a timing chart showing other timing of the output signal of each constituent element of the horizontal contraction filter.
Figure 9:
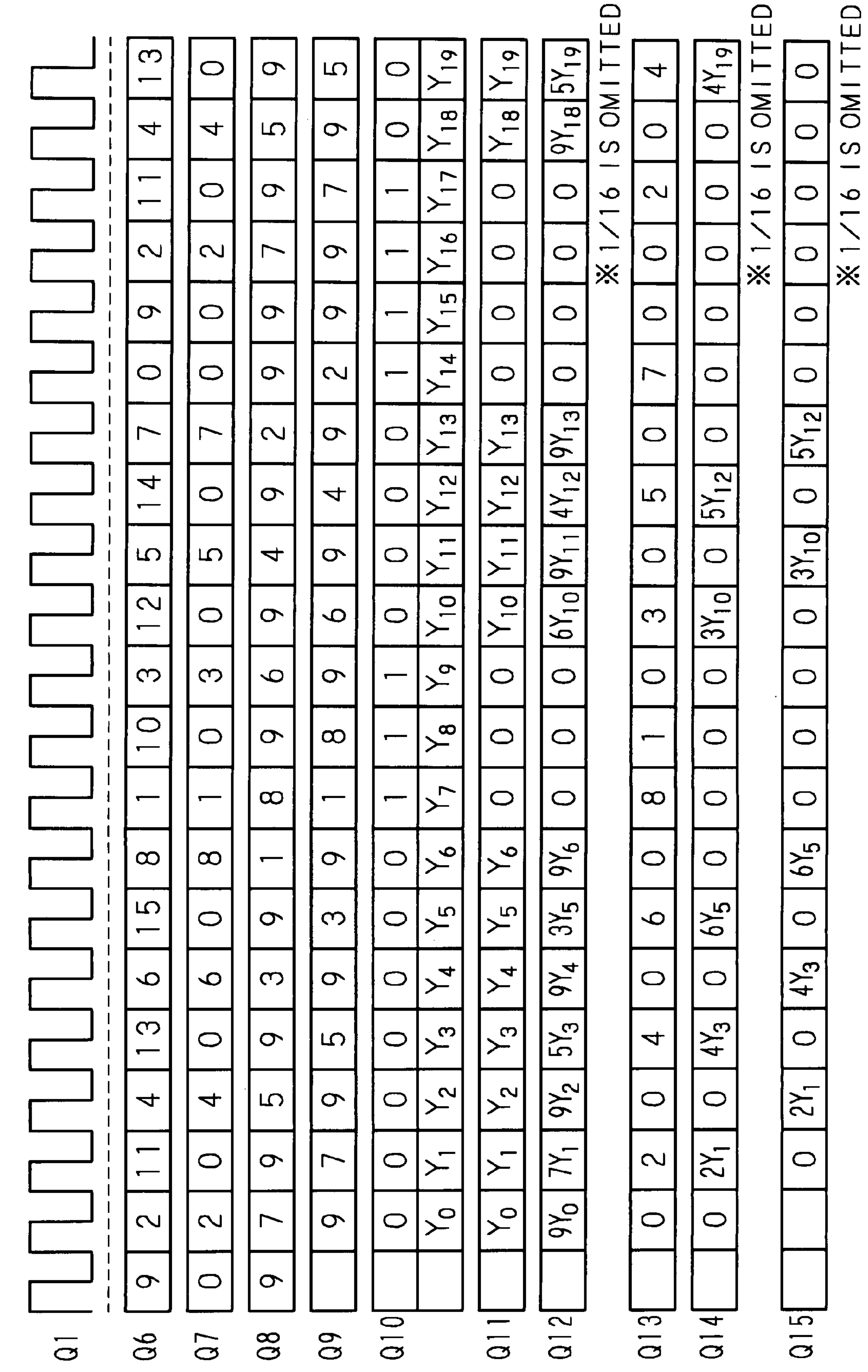
FIG. 9 is a timing chart showing other timing of the output signal of each constituent element of the horizontal contraction filter.

The line memory 14*b* samples the output signal (signal Q22) from the horizontal contraction filter 14*a* at a timing that the validity discrimination signal (signal Q5) shows a high level ("1"), and stores this output signal in itself (see FIG. 1 and FIG. 7). As described above, the horizontal contraction processing of the synthesized image signal is completed. Note that in this case, the identification information is also stored in data stored in the line memory 14*b*, thus making it possible to perform similar processing by the vertical contraction filter 14*c* of the next stage.

By an operation as described above, as shown in FIG. 7, regarding the character signal, "$Y_8$", and "$Y_{16}$" are outputted from the horizontal contraction filter 14*a* and stored in the line memory 14*b*. Namely, as the signal for displaying the character, only elements (above-described "$Y_8$" and $Y_{16}$") contained in the character signals "$Y_7$ to $Y_9$" and "$Y_{14}$ to $Y_{17}$" before the processing of changing the resolution are outputted from the horizontal contraction filter 14*a*, and the elements of the image signals "$Y_0$ to $Y_6$", "$Y_{10}$ to $Y_{13}$", and "$Y_{18}$ to $Y_{19}$" before the processing of changing the resolution are not mixed, thus no horizontal bleeding occurs in the image of the character. Of course, the same thing can be for the image signal, and the elements of the character signal are not mixed into the image signal.

Next, explanation is given to a case that the signal with resolution of 1280×720 pixels is changed to the signal with resolution of 720×480 pixels. In this case, the horizontal magnification signal given from the control unit 10 is 720/1280, and accordingly, the magnification N is "9" from the formula (1). In addition, the integer obtained by rounding up the value shown by the magnification signal is "2, and therefore the selector 54 selects and outputs the signal Q19. Incidentally, only a difference that can be given is the magnification signal inputted in the counter 50 and the subtraction circuit 57 and the control signal given to the selector 54 from the control unit 10, between the timing charts of FIG. 8, FIG. 9, FIG. 10, and FIG. 11 showing other timing of the output signal of each constituent element of the horizontal contraction filter 14*a*, and the aforementioned timing charts of FIG. 4, FIG. 5, FIG. 6, and FIG. 7. Accordingly, detailed explanation for the timing chart of FIG. 8, FIG. 9, FIG. 10, and FIG. 11 is not given here.

Figure 11:
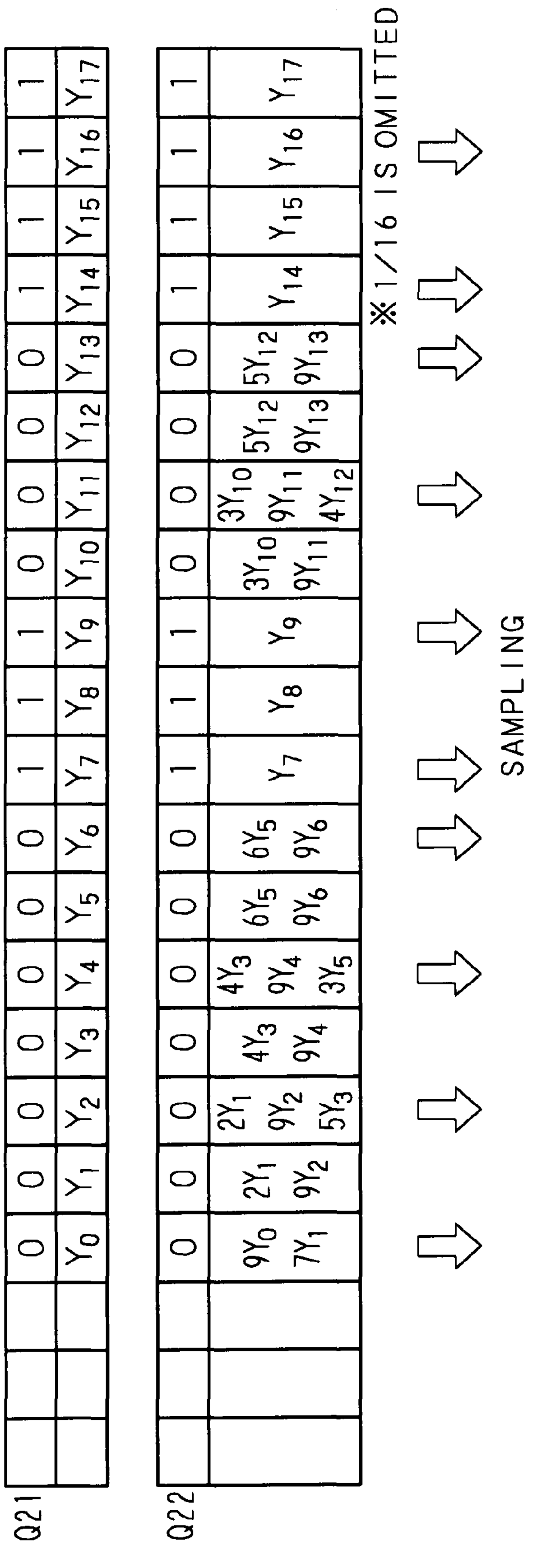
FIG. 11 is a timing chart showing other timing of the output signal of each constituent element of the horizontal contraction filter.

Consequently, as shown in FIG. 11, even when the signal with resolution of 1280×720 pixels is changed to the signal with resolution of 720×480 pixels, as described above, the character signal such as "$Y_7$", "$Y_9$", "$Y_{14}$", and "$Y_{16}$" are outputted from the horizontal contraction filter 14*a* and stored in the line memory 14*b*. Namely, as the signal for displaying the character, only the elements (above-described "$Y_7$", "$Y_9$", "$Y_{14}$", and "$Y_{16}$") contained in the character signals "$Y_7$ to $Y_9$", and "$Y_{14}$ to $Y_{17}$" before the processing of changing the resolution are outputted from the horizontal contraction filter 14*a*, and the image signals "$Y_0$ to $Y_6$", "$Y_{10}$ to $Y_{13}$", and "$Y_{18}$ to $Y_{19}$" before the processing of changing the resolution are not mixed, thus no bleeding occurs in the horizontal direction in the image of the character.

Figure 12:
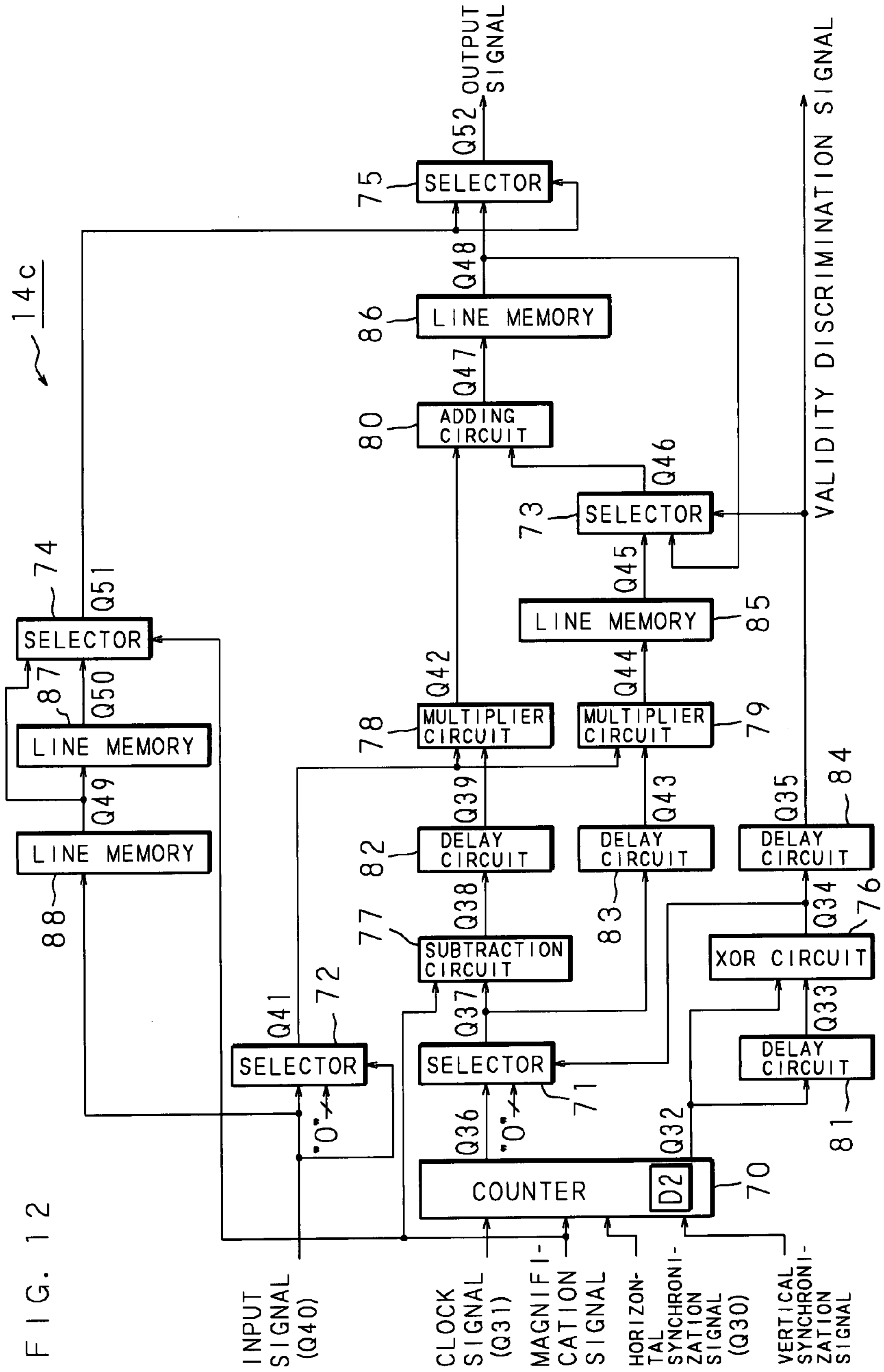
FIG. 12 is a block diagram showing a constitutional example of a vertical contraction filter.

Next, a constitution of the vertical contraction filter 14*c* is explained with reference to the drawings showing an example thereof. FIG. 12 is a block diagram showing the constitutional example of the vertical contraction filter 14*c*, and FIG. 13, FIG. 14, FIG. 15, and FIG. 16 are timing charts showing the timing of the output signal of each constituent element of the vertical contraction filter 14*c*.

The vertical contraction filter 14*c* includes a counter 70, selectors 71, 72, 73, 74, 75, an XOR circuit 76, a subtraction circuit 77, multiplier circuits 78, 79, an adding circuit 80, delay circuits (for one-clock delay) 81, 82, 83, a delay circuit (for two-clock delay) 84, line memories (for one-clock delay) 85, 86, 87, and a line memory (for two-clock delay) 88, and so forth. Here, a clock corresponds to a cycle of the vertical synchronization signal, namely delay processing of one line.

A clock signal Q31, a horizontal synchronization signal Q30, the vertical synchronization signal, and the magnification signal are inputted in the counter 70. The vertical synchronization signal is used for resetting the internal counter value D2 of the counter 70. Note that the vertical synchronization signal is obtained by separating the synchronization signal (containing the horizontal synchronization signal and the vertical synchronization signal) superposed on the image signal and further separating this synchronization signal into the horizontal synchronization signal and the vertical synchronization signal. In addition, the horizontal synchronization signal Q30 is used for counting up the internal count value D2 of the counter 70.

Figure 13:
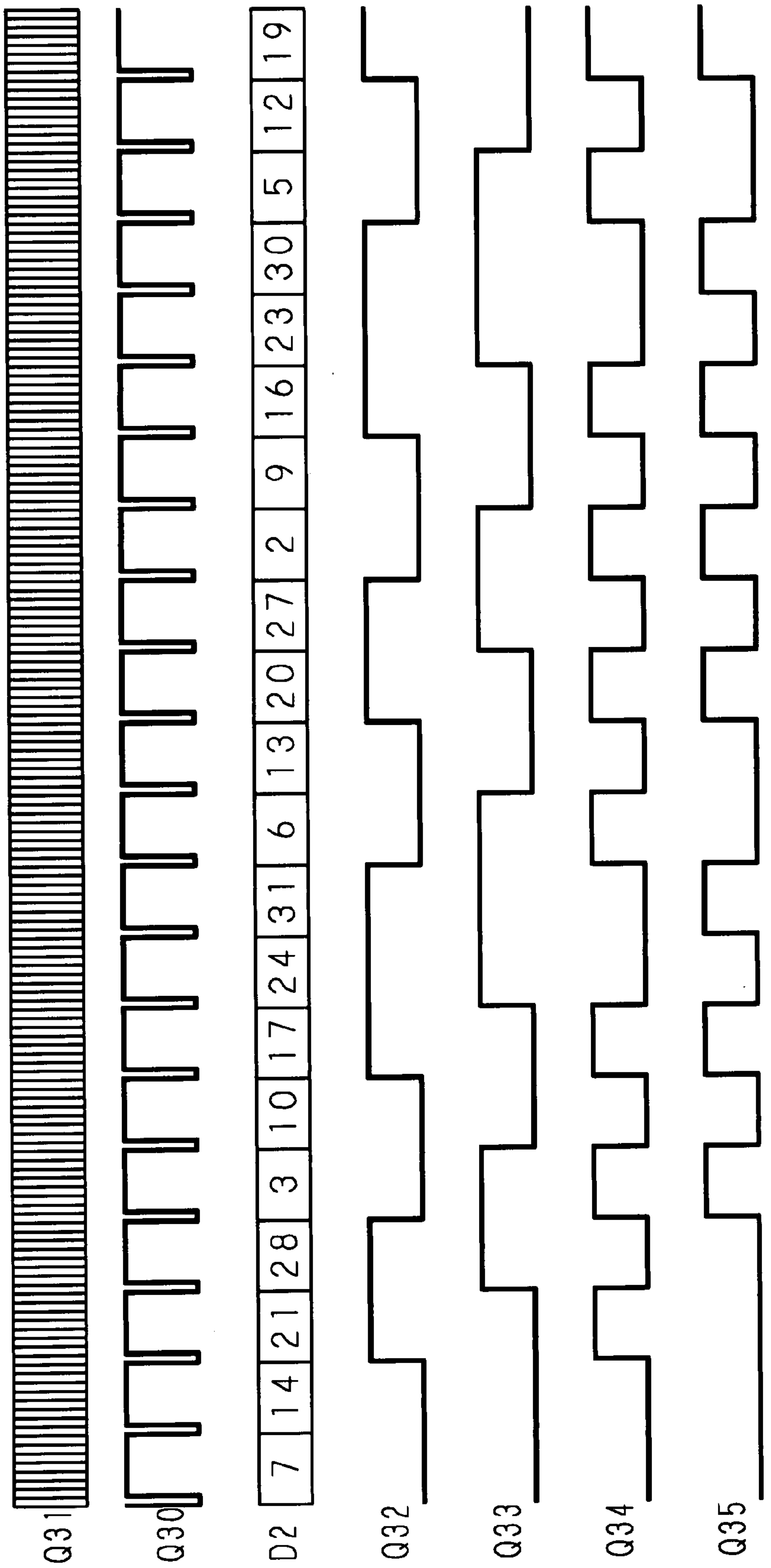
FIG. 13 is a timing chart showing the timing of the output signal of each constituent element of the vertical contraction filter.

The counter 70 increments the internal counter value D2 by a unit of magnification M by every one cycle of the horizontal synchronization signal Q30, in synchronization with the clock signal Q31 (see FIG. 13). The magnification M is calculated from the magnification signal given from the control unit 10. Specifically, the magnification M can be calculated from the following formula (2), by using a vertical resolution V1 of the inputted synthesized image signal, a vertical resolution V2 of the outputted synthesized image signal, and the base $2^x$ of the counter 70. In order to simplify the explanation, the explanation will be given hereunder for the case of V1=1080, V2=480, and X=4. Note that in this case, the magnification M is "7". However, in the same way as the case of the aforementioned horizontal contraction filter 14*a*, the bit number K of the counter 70 is obtained by adding 1 bit to the bit number X of the base $2^x$ of division. In this embodiment, the base is 16 (X=4), and the bit number K is 5.

$$M=(V2/V1)\times 2^x \tag{2}$$

wherein V2/V1 is the vertical magnification.

The counter 70 outputs the value of the most significant bit of the internal counter value D2, to the delay circuit 81 and the XOR circuit 76 as a signal Q32. The delay circuit 81 delays the inputted signal Q32 by one clock, and outputs it to the XOR circuit 76 as a signal Q33. The XOR circuit 76 performs the exclusive logical sum operation of the inputted signal Q32 and signal Q33, and outputs this result to the delay circuit 84 and the selector 71 as a signal Q34. The delay circuit 84 delays the inputted signal Q34 by two clocks, and outputs it to the selector 73 as a signal Q35, and also outputs it to the dual-port memory 14*d* as the validity discrimination signal (regarding the above, see FIG. 13). Note that in the selector 71, the signal Q34 is the control signal for determining the selection timing of the signal and determining which input signal is selected and outputted, and a signal Q35 is the control signal for determining the selection timing of the signal and determining which input signal is selected and outputted, in the selector 73.

The counter 70 outputs to the selector 71 a signal Q36 with 4 bits of lower-order of the internal counter value D2. The aforementioned signal Q36 with 4 bits and the low level signal, with all bits set to "0" are given to the selector 71 as an input signal, and the output signal is selected, with the signal Q34 as the control signal. Specifically, the selector 71 selects the signal Q36 when the signal Q34 is "1", and selects the low level signal, with all bits set to "0", when the signal Q34 is "0", and outputs the selected signal to the subtraction circuit 77 and the delay circuit 83 as a signal Q37.

Other than the aforementioned signal Q37, the aforementioned magnification signal is inputted in the subtraction circuit 77. The subtraction circuit 77 outputs the result obtained by subtracting the signal Q37 from the magnification signal ("7" in this case) to the delay circuit 82 as a signal Q38. The delay circuit 82 delays the inputted signal Q38 by one clock, and outputs it to the multiplier circuit 78 as a signal Q39.

A signal Q40 read from the line memory 14*b* and the low level signal, with all bits set to "0" are given to the selector 72 as an input signal. More specifically, the identification information with 1 bit of the signal Q40 is inputted to the selector 72 as the control signal, and a part other than the identification information is inputted to the selector 72 as the signal to be selected, respectively. Then, the selector 72 selects the signal other than the identification information for the signal Q40 when the identification information for the signal Q40 is "0", and selects the low level signal, with all bits set to "0", when the identification information for the signal Q40 is "1", and outputs the selected signal to the multiplier circuits 78 and 79 as a signal Q41. The multiplier circuit 78 outputs the result obtained by multiplying the signal Q41 and the signal Q39 to the adding circuit 80 as a signal Q42.

The delay circuit 83 delays the inputted signal Q37 by one clock, and outputs it to the multiplier circuit 79 as a signal Q43. The multiplier circuit 79 outputs the result obtained by multiplying the signal Q41 and the signal Q43 to the line memory 85 as a signal Q44. As is clarified from the creation process of the signal Q42 and the signal Q44, in the multiplier circuit 79, the coefficient based on the magnification signal is multiplied to create the signal Q44, and in the multiplier circuit 78, the complement of the coefficient based on the magnification signal is multiplied to create the signal Q42. Accordingly, the multiplier circuit 79 functions as the first multiplying means according to the present invention, and the multiplier circuit 78 functions as the second multiplying means according to the present invention, respectively. Note that the signals Q42 and Q44 outputted from the multiplier circuits 78 and 79 are added by the adding circuit 80 as will be described later and are subjected to smoothing processing.

Figure 14:
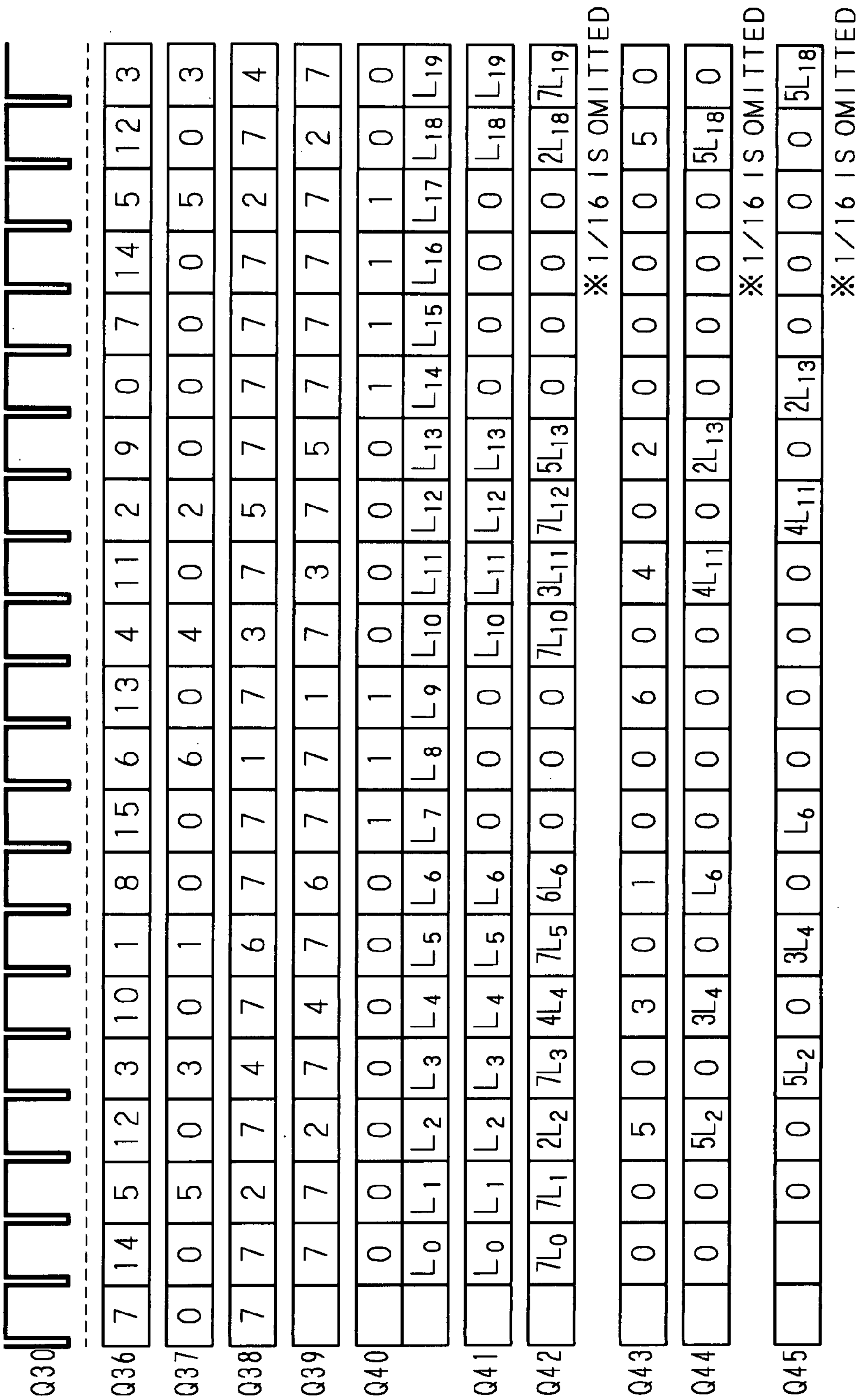
FIG. 14 is a timing chart showing the timing of the output signal of each constituent element of the vertical contraction filter.
Figure 15:
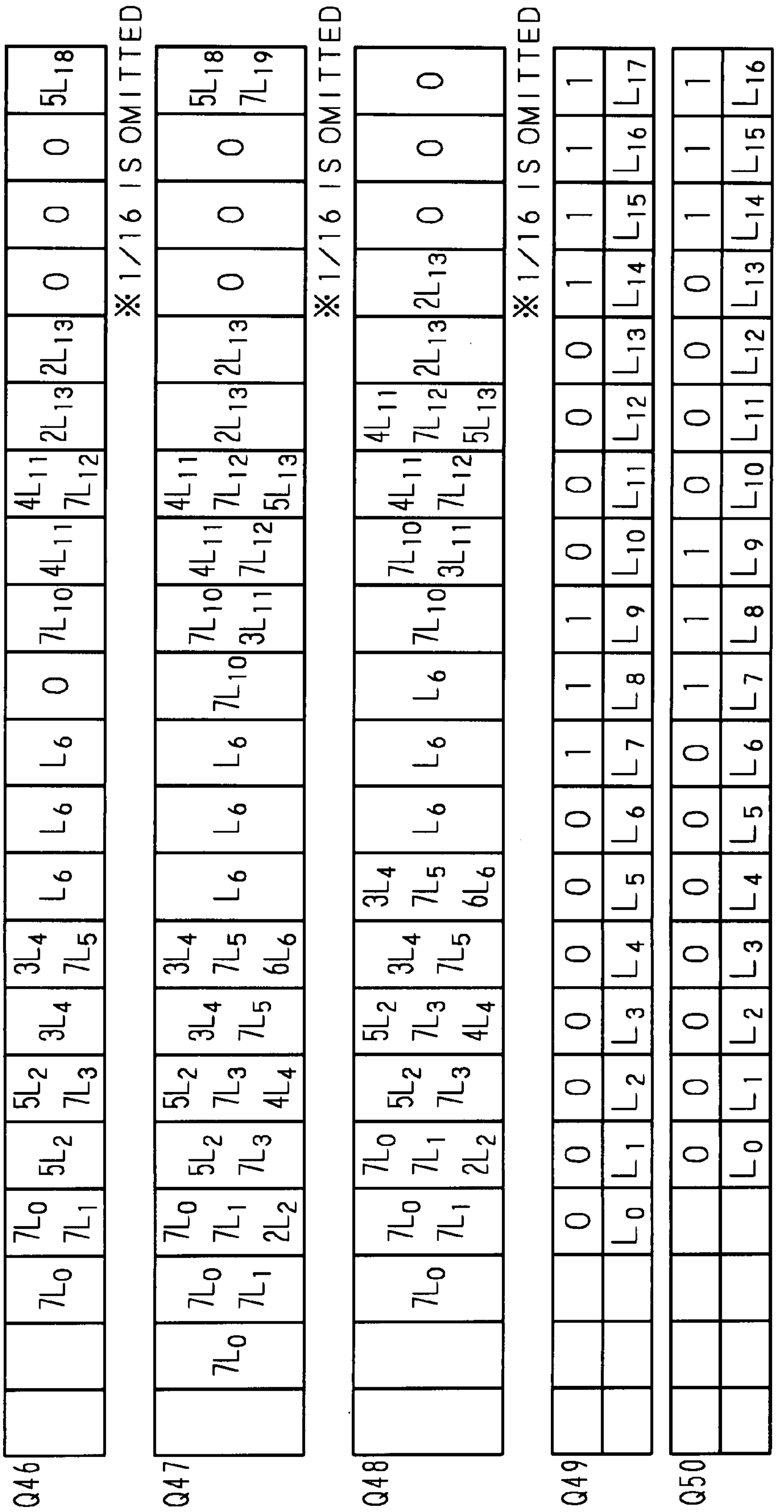
FIG. 15 is a timing chart showing the timing of the output signal of each constituent element of the vertical contraction filter.

The line memory 85 delays the inputted signal Q44 by one clock, and outputs it to the selector 73 as a signal Q45 (regarding the above, see FIG. 14). A signal Q48 as will be described later is also inputted in the selector 73 other than the signal Q45, as the signal to be selected, and the output signal is selected, with the aforementioned signal Q35 as the control signal. Specifically, the selector 73 selects the signal Q45 when the signal Q35 is "1", and selects the signal Q48 when the signal Q35 is "0", and outputs the selected signal to the adding circuit 80 as the signal Q46. The adding circuit 80 outputs the result obtained by adding the signal Q42 and the signal Q46 to the line memory 86 as a signal Q47. The line memory 86 delays the inputted signal Q47 by one clock, and outputs it to the selector 73 and the selector 75 as a signal Q48. Accordingly, the selector 73, the adding circuit 70, and the line memory 86 constitute the feedback loop.

The line memory 88 delays the inputted signal Q40 by two clocks, and outputs it to the line memory 87 and the selector 74 as a signal Q49. The line memory 87 delays the inputted signal Q49 by one clock, and outputs it to the selector 74 as a signal Q50 (regarding the above, see FIG. 15). The vertical magnification signal given from the control unit 10 is inputted in the selector 74 as the control signal. The selector 74 selects the signal Q50 when the integer obtained by rounding up the value shown by the magnification signal is "3", selects the signal Q49 when this integer is "2", and outputs the selected signal to the selector 75 as a signal Q51. Namely, the delay amount of the character signal is changed according to the magnification of the delay amount of the character signal, so that when the integer obtained by rounding up the value shown by the magnification signal is "3", the delay amount of the character signal is 3 clocks, and when this integer is "2", the delay amount of the character signal is two clocks. In this embodiment, the integer is "3", and therefore the selector 74 selects and outputs the signal Q50.

The identification information with 1 bit added to the signal Q51 is inputted in the selector 75 as the control signal, and the signal Q51 containing the identification information is inputted to the selector 75 as the signal to be selected, respectively. Accordingly, the selector 75 selects the output signal, with the identification information added to the signal Q51 as the control signal. Specifically, the selector 75 selects the signal Q51 when the identification information added to the signal Q51 is "1", selects the signal Q48 when the identification information is "0", and output the selected signal to the outside (dual-port memory 14*d*) as a signal Q52 (see FIG. 16). Thus, from the vertical contraction filter 14*c*, the signal Q52 is outputted to the dual-port memory 14*d* as the output signal, and the signal Q35 is outputted to the dual-port memory 14*d* as the validity discrimination signal, respectively.

Figure 16:
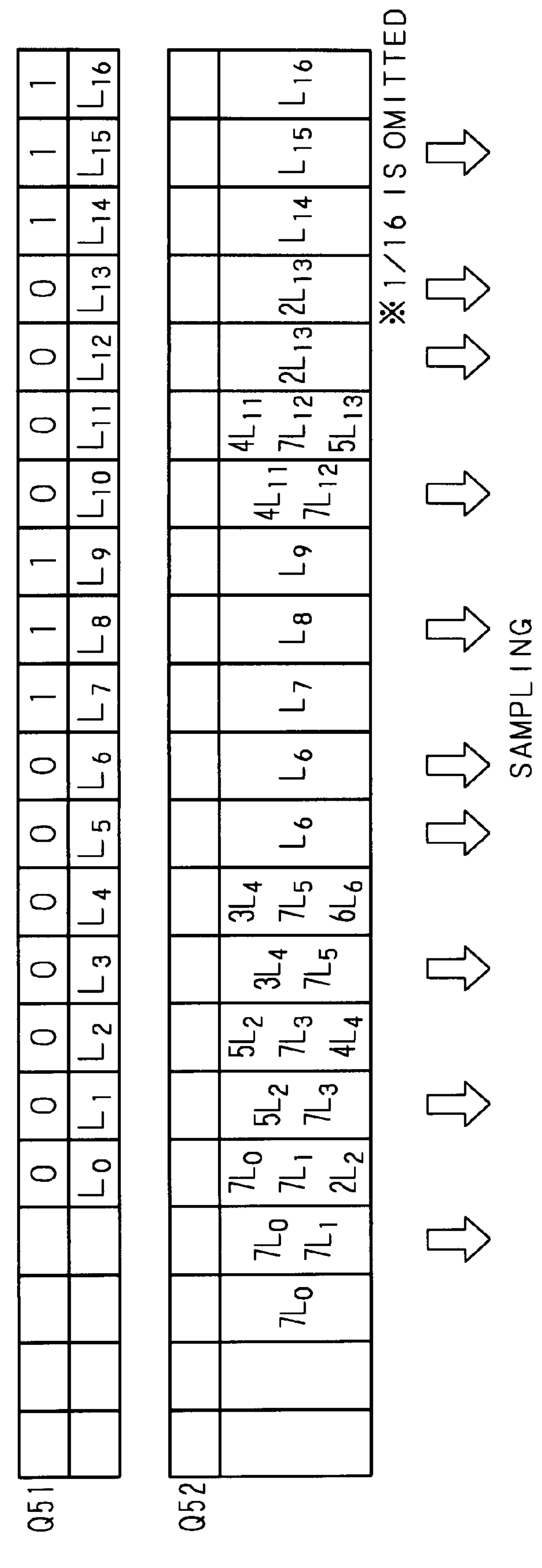
FIG. 16 is a timing chart showing the timing of the output signal of each constituent element of the vertical contraction filter.

The dual-port memory 14*d* samples the output signal (signal Q52) from the vertical contraction filter 14*c* at a timing when the validity discrimination signal (signal Q35) shows a high level ("1") and stores this output signal in itself (see FIG. 13 and FIG. 16). As described above, the vertical contraction processing of the synthesized image signal is completed. Note that a sampling frequency of a high vision signal is 74.25 MHz, and the sampling frequency of NTSC/PAL is 13.5 MHz. Therefore, when the signal is stored in the dual-port memory 14*d*, it is written therein by a clock frequency of 74.25 MHz, and read therefrom by a clock frequency of 13.5 MHz.

By the operation as described above, as shown in FIG. 16, character signals such as "$L_7$", "$L_9$", and "$L_{16}$" are outputted from the vertical contraction filter 14*c* and stored in the dual-port memory 14*d*. Namely, as the signal for displaying the character, only the elements (the above-described "$L_7$", "$L_9$", and "$L_{16}$") contained in the character signals "$L_7$ to $L_9$", and "$L_{14}$ to $L_{17}$" before the processing of changing the resolution are outputted from the vertical contraction filter 14*c*, and the image signals "$L_0$ to $L_5$", "$L_{10}$ to $L_{13}$", and "$L_{18}$ to $L_{19}$" before the processing of changing the resolution are not mixed, thus no vertical bleeding occurs in the image of the character. Accordingly, even when an image size is contracted as is seen in this embodiment, no bleeding occurs in the character of the contracted image under an influence of the peripheral image. Therefore, it is possible to surely discriminate the character by a user when the image is displayed.

In addition, according to the aforementioned embodiment, by separating the image signal from the character signal by the selectors 52 and 72, the smoothing processing is performed for re-configuring each pixel based on each pixel of the image signal and the peripheral pixel of this pixel. Further, regarding the character signal, each pixel is re-configured by so-called thinning. However, also in the character signal, the smoothing processing can be performed. Also, in the aforementioned embodiment, explanation is given to a case of contracting the synthesized image signal. However, of course the present invention can be applied to a case of expanding the synthesized image signal.

Further, the signal processing device and the image output device according to the present invention can be applied to devices such as a tuner device, a television reception device, an image reproduction device, and an image recorder. In any case, it is possible to output the same image signals with different resolutions to a plurality of display devices simultaneously and display thereon simultaneously.

As this invention may be embodied in several forms without departing from the spirit of essential characteristics thereof, the present embodiments are therefore illustrative and not restrictive, since the scope of the invention is defined by the appended claims rather than by the description receding them, and all changes that fall within metes and bounds of the claims, or equivalence of such metes and bounds there-of are therefore intended to be embraced by the claims.

The invention claimed is:

1. A signal processing device for changing a resolution of a synthesized image signal obtained by synthesizing a first image signal and a second image signal, comprising:

a first separating unit for separating the synthesized image signal into a third image signal containing a component of the first image signal and a fourth image signal containing no component of the first image signal, based on presence/absence of the first image signal in the synthesized image signal;

a resolution changing unit for changing both resolutions of the third image signal and fourth image signal separated by the first separating unit to the same resolutions; and a synthesizing unit for synthesizing the third image signal and the fourth image signal with the resolutions changed to the same resolutions by the resolution changing unit, wherein the resolution changing unit comprises:

a second separating unit for separating the fourth image signal into two systems;

a first multiplying unit for multiplying the fourth image signal of one system separated by the second separating unit by a predetermined coefficient;

a second multiplying unit for multiplying the fourth image signal of the other system separated by the second separating unit by a complement of the predetermined coefficient;

a delay unit for delaying the fourth image signal of the one system multiplied by the first multiplying unit; and an adding unit for adding the fourth image signal of the other system multiplied by the second multiplying unit and the one fourth image signal delayed by the delay unit.

2. The signal processing device as set forth in claim 1, further comprising an information adding unit for adding identification information for identifying whether or not the first image signal is contained in the synthesized image signal, to the synthesized image signal based on presence/absence of the first image signal, wherein the first separating unit determines the presence/absence of the first image signal in the synthesized image signal based on the identification information.

3. The signal processing device as set forth in claim 1, wherein the resolution changing unit further comprises a delay unit for delaying the third image signal according to a delay amount generated by processing of changing a resolution of the fourth image signal.

4. The signal processing device as set forth in claim 3, further comprising:

a receiving unit for receiving a change rate of the resolution; and a calculating unit for calculating the predetermined coefficient according to the change rate received by the receiving unit.

5. The signal processing device as set forth in claim 1, wherein identification information for identifying whether or not the first image signal is contained in the synthesized image signal is added to the synthesized image signal, and the first separating unit determines the presence/absence of the first image signal in the synthesized image signal based on the identification information.

6. A signal processing device for changing a resolution of a synthesized image signal obtained by synthesizing a first image signal and a second image signal, comprising:

first separating means for separating the synthesized image signal into a third image signal containing a component of the first image signal and a fourth image signal containing no component of the first image signal, based on presence/absence of the first image signal in the synthesized image signal;

resolution changing means for changing both resolutions of the third image signal and fourth image signal separated by the first separating means to the same resolutions; and synthesizing means for synthesizing the third image signal and the fourth image signal with the resolutions changed to the same resolutions by the resolution changing means, wherein the resolution changing means comprises:

second separating means for separating the fourth image signal into two systems;

first multiplying means for multiplying the fourth image signal of one system separated by the second separating means by a predetermined coefficient;

second multiplying means for multiplying the fourth image signal of the other system separated by the second separating means by a complement of the predetermined coefficient;

delay means for delaying the fourth image signal of the one system multiplied by the first multiplying means; and adding means for adding the fourth image signal of the other system multiplied by the second multiplying means and the one fourth image signal delayed by the delay means.

7. The signal processing device as set forth in claim 6, further comprising information adding means for adding identification information for identifying whether or not the first image signal is contained in the synthesized image signal, to the synthesized image signal based on presence/absence of the first image signal, wherein the first separating means determines the presence/absence of the first image signal in the synthesized image signal, based on the identification information.

8. The signal processing device as set forth in claim 6, wherein the resolution changing means further comprises delay means for delaying the third image signal according to a delay amount generated by processing of changing a resolution of the fourth image signal.

9. The signal processing device as set forth in claim 8, further comprising:

receiving means for receiving a change rate of the resolution; and calculating means for calculating the predetermined coefficient according to the change rate received by the receiving means.

10. The signal processing device as set forth in claim 6, wherein identification information for identifying whether or not the first image signal is contained in the synthesized image signal is added to the synthesized image signal, and the first separating means determines the presence/absence of the first image signal in the synthesized image signal, based on the identification information.

11. An image output device for changing a first synthesized image signal with first resolution having a first image signal and a second image signal synthesized, to a second synthesized image signal with second resolution different from the first resolution, and outputting the first synthesized image signal and second synthesized image signal, comprising:

a first output unit for outputting the first synthesized image signal;

a signal processing device including:

a first separating unit for separating the first synthesized image signal into a third image signal containing a component of the first image signal and a fourth image signal containing no component of the first image signal based on presence/absence of the first image signal in the first synthesized image signal;

a resolution changing unit for changing both resolutions of the third image signal and fourth image signal separated by the first separating unit to the same second resolutions; and a synthesizing unit for synthesizing the third image signal and the fourth image signal with the resolutions changed to the same second resolutions by the resolution changing unit; and a second output unit for outputting the second synthesized image signal with the second resolution synthesized by the synthesizing unit, wherein the resolution changing unit of the signal processing device comprises:

a second separating unit for separating the fourth image signal into two systems;

a first multiplying unit for multiplying the fourth image signal of one system separated by the second separating unit by a predetermined coefficient;

a second multiplying unit for multiplying the fourth image signal of the other system separated by the second separating unit by a complement of the predetermined coefficient;

a delay unit for delaying the fourth image signal of the one system multiplied by the first multiplying unit; and an adding unit for adding the fourth image signal of the other system multiplied by the second multiplying unit and the one fourth image signal delayed by the delay unit.

12. The image output device as set forth in claim 11, further comprising an information adding unit for adding identification information for identifying whether or not the first image signal is contained in the first synthesized image signal, to the first synthesized image signal based on presence/absence of the first image signal in the first synthesized image signal, wherein the first separating unit of the signal processing device determines the presence/absence of the first image signal in the first synthesized image signal, based on the identification information.

13. The image output device as set forth in claim 11, wherein the resolution changing unit of the signal processing device further comprises a delay unit for delaying the third image signal according to a delay amount generated by processing of changing a resolution of the fourth image signal.

14. The image output device as set forth in claim 13, wherein the signal processing device further comprises:

a receiving unit for receiving a change rate of the resolution; and a calculating unit for calculating the predetermined coefficient according to the change rate received by the receiving unit.

15. The image output device as set forth in claim 11, wherein identification information for identifying whether or not the first image signal is contained in the first synthesized image signal is added to the first synthesized image signal, and the first separating unit of the signal processing device determines the presence/absence of the first image signal in the first synthesized image signal, based on the identification information.

16. An image output device for changing a first synthesized image signal with first resolution having a first image signal and a second image signal synthesized, to a second synthesized image signal with second resolution different from the first resolution, and outputting the first synthesized image signal and second synthesized image signal, comprising:

a first output unit for outputting the first synthesized image signal;

a signal processing device including:

first separating means for separating the first synthesized image signal into a third image signal containing a component of the first image signal and a fourth image signal containing no component of the first image signal based on presence/absence of the first image signal in the first synthesized image signal;

resolution changing means for changing both resolutions of the third image signal and fourth image signal separated by the first separating means to the same second resolutions; and synthesizing means for synthesizing the third image signal and the fourth image signal with the resolutions changed to the same second resolutions by the resolution changing means; and a second output unit for outputting the second synthesized image signal with the second resolution synthesized by the synthesizing means, wherein the resolution changing means of the signal processing device comprises:

second separating means for separating the fourth image signal into two systems;

first multiplying means for multiplying the fourth image signal of one system separated by the second separating means by a predetermined coefficient;

second multiplying means for multiplying the fourth image signal of the other system separated by the second separating means by a complement of the predetermined coefficient;

delay means for delaying the fourth image signal of the one system multiplied by the first multiplying means; and adding means for adding the fourth image signal of the other system multiplied by the second multiplying means and the one fourth image signal delayed by the delay means.

17. The image output device as set forth in claim 16, further comprising information adding means for adding identification information for identifying whether or not the first image signal is contained in the first synthesized image signal, to the first synthesized image signal based on presence/absence of the first image signal in the first synthesized image signal, wherein the first separating means of the signal processing device determines the presence/absence of the first image signal in the first synthesized image signal, based on the identification information.

18. The image output device as set forth in claim 16, wherein the resolution changing means of the signal processing device further comprises delay means for delaying the third image signal according to a delay amount generated by processing of changing a resolution of the fourth image signal.

19. The image output device as set forth in claim 18, wherein the signal processing device further comprises:

receiving means for receiving a change rate of the resolution; and calculating means for calculating the predetermined coefficient according to the change rate received by the receiving means.

20. The image output device as set forth in claim 16, wherein identification information for identifying whether or not the first image signal is contained in the first synthesized image signal is added to the first synthesized image signal, and the first separating means of the signal processing device determines the presence/absence of the first image signal in the first synthesized image signal, based on the identification information.

* * * * *